United States Patent [19]
Ito et al.

[11] Patent Number: 6,026,644
[45] Date of Patent: *Feb. 22, 2000

[54] STABILIZER FOR GAS TURBINE COMBUSTORS AND GAS TURBINE COMBUSTOR EQUIPPED WITH THE STABILIZER

[75] Inventors: Kazuyuki Ito, Katsuta; Tadayoshi Murakami, Hitachi; Kazuhiko Kawaike, Katsuta; Shigeru Azuhata; Michio Kuroda, both of Hitachi, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/700,882

[22] Filed: Aug. 21, 1996

Related U.S. Application Data

[62] Division of application No. 08/220,251, Mar. 30, 1994, Pat. No. 5,575,153.

[30] Foreign Application Priority Data

Apr. 7, 1993 [JP] Japan ................................ 5-80613
Sep. 20, 1993 [JP] Japan ................................ 5-233393

[51] Int. Cl.⁷ .............................. F02C 9/28; F23R 3/18
[52] U.S. Cl. ........................... 60/737; 60/39.27; 60/749
[58] Field of Search ........................ 60/39.27, 39.29, 60/737, 749, 738

[56] References Cited

U.S. PATENT DOCUMENTS

| | | |
|---|---|---|
| 2,918,794 | 12/1959 | Hurd . |
| 2,935,847 | 5/1960 | Markowski . |
| 2,978,868 | 4/1961 | Puffer . |
| 3,605,407 | 9/1971 | Bryce . |
| 3,736,746 | 6/1973 | DuBell et al. . |
| 3,975,902 | 8/1976 | Smith et al. ............................ 60/39.27 |
| 4,418,531 | 12/1983 | Beal . |
| 4,445,339 | 5/1984 | Davis, Jr. et al. . |
| 5,024,055 | 6/1991 | Sato et al. ............................ 60/39.27 |
| 5,129,226 | 7/1992 | Bigelow et al. . |
| 5,216,885 | 6/1993 | Taniguchi et al. . |
| 5,319,936 | 6/1994 | Ikeda et al. ............................. 60/737 |
| 5,323,614 | 6/1994 | Tsukahara et al. ..................... 60/737 |
| 5,327,718 | 7/1994 | Iwata et al. ........................... 60/39.27 |
| 5,328,355 | 7/1994 | Kobayashi et al. ...................... 60/738 |
| 5,343,693 | 9/1994 | Komatsu et al. ......................... 60/749 |
| 5,349,812 | 9/1994 | Taniguchi et al. .................... 60/39.27 |
| 5,533,329 | 7/1996 | Ohyama et al. ...................... 60/39.27 |

FOREIGN PATENT DOCUMENTS

| | | |
|---|---|---|
| 57-115624 | 7/1982 | Japan . |
| 60-218535 | 1/1985 | Japan . |
| 61-135942 | 6/1986 | Japan . |
| 61-49136 | 11/1986 | Japan . |
| 64-29626 | 1/1989 | Japan . |
| 1-210721 | 8/1989 | Japan . |

*Primary Examiner*—Ted Kim
*Attorney, Agent, or Firm*—Antonelli, Terry, Stout, Kraus, LLP

[57] ABSTRACT

A gas turbine combustor has a premixing burner for jetting out a premixed gas of fuel and air. A stabilizer forms a circulation of combustion gas generated by combustion of the premixed gas at the downstream side of the stabilizer to stabilize flame formed by the combustion of the premixed gas. Before the operation of the combustor, a relationship between a temperature of the stabilizer and combustion conditions of the premixed gas is checked. Thereafter during operation of the combustor, the temperature of the stabilizer is measured during combustion and the combustion conditions are checked according to only the measured temperature of the stabilizer and the aforesaid relationship. The stabilizer has a heat receiving surface at the most downstream side thereof. The temperature of a portion of the stabilizer around the heat receiving surfaces measured to allow an accurate assessment of the combustion conditions.

10 Claims, 14 Drawing Sheets

STABILIZER FOR GAS TURBINE COMBUSTORS AND GAS TURBINE COMBUSTOR EQUIPPED WITH THE STABILIZER

REFERENCE TO RELATED APPLICATION

This application is a Division of application Ser. No. 08/220,251, filed Mar. 30, 1994 now U.S. Pat. No. 5,575,153.

BACKGROUND OF THE INVENTION (a) Field of the Invention

This invention relates to gas turbine combustor stabilizers and gas turbine combustors equipped with the stabilizers. Especially, it is related to stabilizers that can widen the operation range of gas turbine combustors to ensure stable combustion and reduce damages to be caused by high temperature combustion gas and gas turbine combustors equipped with the stabilizers.

Further, the present invention is related to a method to check combustion conditions in each combustor in which premixed combustion is carried out, as well as it is related to a system that executes this method and a controller of the combustor equipment.

(b) Description of the Prior Arts

In order to carry out stable combustion in a gas turbine combustor, it is very important to hold flames, that is, to stabilize the flames. The use of a stabilizer is very effective to assure such an operation. And there have been some types of such stabilizers as disclosed in Japanese Patent Application Laid-Open No. 115624/1982 which is related to a V-letter shape stabilizer (V gutter) with small wings used to effect sufficient mixing in wake occurring at a downstream side of the V gutter, Japanese Patent Application Laid-Open No. 210721/1989, related to a method to attach stabilizers that have simplified V-letter groove shaped cross sections, respectively, and the U.S. Pat. No. 3,736,746, related to the places to put stabilizers.

Gas turbines need to be operated in a wide output range corresponding to a large change of load. As for a power generation land type gas turbine, it must stand long time continuous operations. The gas turbine combustor stabilizer, therefore, must have performance enough to maintain stable combustion conditions and resistance to deformation and cracks by heat under the wide range of operation conditions. Concretely, the stabilizer must be able to prevent occurrence of unstable combustion such as accidental fire, flash back, combustion oscillation, etc. even when the operation condition changes due to a load change, etc. In addition, since the stabilizer is exposed to high temperature combustion gas on the one hand and exposed to the air and fuel gas flowing into the combustor on the other hand, a maximum stabilizer temperature must be controlled within an allowable one for each component material, as well as it must be structured to suppress excessive thermal stress generation in its local spots. The conventional gas turbine combustor stabilizers cannot meet those requirements yet, however.

Further, it is very important to control the combustion conditions in combustors of a gas turbine to reduce exhaust NOx and key uniform the combustion gas temperatures at the combustor outlets to prevent the turbine blades from being excessive loaded. The combustor combustion condition control techniques have been disclosed, for example, in Japanese Patent Application Laid-Open No. 218535/1985, No. 135942/1986, No. 49136/1986, and No. 29626/1989. Those techniques are roughly classified into controlling of the fuel amount to jet out according to the combustion gas temperature detected at the combustor outlet and controlling of the fuel amount to jet out according to the NOx concentration detected at the combustor outlet.

In addition to those techniques, another technique is introduced, which technique controls the fuel amount to jet out, etc. using an image processing technique from filmed flame images formed in the subject combustor.

SUMMARY OF THE INVENTION (a) Objects of the Invention

A first object of this invention is to provide a gas turbine combustor stabilizer that satisfies the two requirements mentioned above, that is, to provide a gas turbine combustor stabilizer that can improve the combustion stability and prevent the temperature of each component material from rising excessively.

A second object of this invention is to provide a gas turbine engine, a gas turbine power plant, or a cogeneration system equipped with a gas turbine combustor improved for the combustion stability and the durability.

Further another object of this invention is to provide a method of checking the combustion conditions accurately, a system for executing this method, and a controller to control the combustor equipment according to the combustion conditions checked with the method.

In recent years, gas turbine combustors have a tendency to adopt premixed combustion, which combusters have been designed so that premixed combustion may be possible to reduce the amount of exhaust NOx. This premixed combustion is excellent in reduction of exhaust NOx more than diffusing combustion, but it is inferior to the diffusing combustion in the aspect of flame stability. This is why combustors used for premixed combustion each are provided with a stabilizer at a premixing burner or designed so that a swirling flow is formed in a combustion chamber to stabilize premixed combustion flames.

Basically, it can be said that the combustion gas temperature and NOx concentration detected at the combustor outlet in the prior art have a certain relationship with the combustion conditions. However, if a stabilizer is provided at a premixing burner or a swirling flow is formed in the combustion chamber, then the combustion gas temperature or NOx concentration at the combustor outlet does not always indicate the combustion conditions at the upstream side accurately. In addition, the air to be fed into the combustion chamber for cooling combustion chamber materials and diluting the combustion gas, etc. becomes a factor of such non-accurate indication of the said combustion gas temperature and NOx concentration at the combustor outlet. To avoid this problem, measuring the temperature of the flame itself directly using a thermometer is considered to be one of the effective means. However, there does not yet exist a thermometer that can measure such very high temperatures of flames. Even if such a thermometer exists, it would be unfavorable to measure the flame temperature using the thermometer. This is because, the flame will be disturbed by the thermometer itself and it will become impossible to measure the flame temperature accurately in such an unstable flame.

If flame images are used to judge the combustion conditions, the problems mentioned above do not arise. This is because the target flame is observed directly. In spite of this, it will be difficult to focus on such a flame accurately, since the flame spreads and shakes in the space. Depending on the accessing direction, flames are overlapped with each other making it impossible to take an image of only the target one in many cases.

In other words, the combustion conditions cannot be accurately checked in the prior art gas turbine combustors.

(b) Statement of the Invention

In general, a stabilizer stabilizes flames by circulating the combustion gas formed in wake of the stabilizer. The fuel and air burn in the process in which they are mixed with the combustion gas. Since unstable combustion such as accidental fire, combustion oscillation, etc. is caused by the combustor structure and operation conditions, it is difficult to show how to improve the combustion conditions universally.

Studying in detail the combustion process of gas turbine combustors, the inventors have found that it is important to start a stable combustion reaction at a point around the stabilizer by adjusting the mixing process to complete this invention.

In this invention, turbulence promoters are provided on the stabilizer surface except for the combustion gas heating surface as a means to adjust the mixing process.

Furthermore, in this invention, multiple turbulence promoters are provided on the stabilizer surface except for the combustion gas heating surface, whereby the distance between the turbulence promotor closest to the heating surface and the heating surface is set to at least 4 times the height of the turbulence promotor.

Preferably, the stabilizer used in this invention comprises a stabilizer portion and a support portion. It is also desirable that the stabilizer portion and the support portion should be united into one, and the angle between the support portion and the stabilizer portion is within a range of 120° to 160°. The turbulence promoters are within 0.1 mm to 1 mm in height.

The second object of this invention will be achieved when a gas turbine combustor equipped with the stabilizer of this invention is incorporated in a gas turbine engine, a gas turbine power plant or a cogeneration system.

When the turbulence promoters are arranged on the stabilizer surface except for the combustion gas heating surface, a small swirl is formed by the air and fuel flowing behind each of those turbulence promoters. This breaks each temperature boundary layer. As a result, the heat transfer coefficient is increased and the heat transmission from the relatively high temperature stabilizer to the air and fuel flowing around the stabilizer is accelerated. Usually, the temperature of the air and fuel flow is 200 to 400° C., while the temperature of the stabilizer is 500 to 800° C. When the heat transmission between them is accelerated, the temperature of the air and fuel rises and makes it easier to start the combustion in the mixing process in which the temperature of the air and fuel flow is high. Thus, the combustion can be much more stabilized. In addition, such accelerating of the heat transmission is also effective to reduce the temperature of the stabilizer itself.

In general, the length of the vortex formed by the turbulence promotor is about 4 times the height of the turbulence promotor. When this vortex reaches the heating surface, the flame has a great potential to flash back to the upstream side of the stabilizer heating surface. This potential can be lowered by setting the distance between the turbulence promotor closest to the heating surface and the heating surface to more than 4 times the height of the turbulence promotor.

The air and fuel flow may be disturbed significantly by a load change in a gas turbine combustor. In such a disturbed air flow, the turbulence promotor is not so effective for heat transmission. However, the heat transmission even in such a disturbed air flow could be improved if the stabilizer with turbulence promoters arranged on its surface comprises a stabilizer portion that has a combustion gas heating surface, and a support portion provided downstream of the stabilizer portion. In other words, the support portion of the stabilizer should be set at the upstream portion of the stabilizer portion, so that the disturbance of the air flow is attenuated by the support portion. Thus, the heat transmission from the turbulence promoters arranged on the surface of the stabilizer is not disturbed so much. If the stabilizer portion and the support portion are united into one, then the heat conduction from the high temperature flame stabilizer portion to the relatively low temperature support portion will be much smoother.

If the stabilizer portion and the support portion of the stabilizer are united into one and the angle between the stabilizer portion and the support portion is set within 120° to 160°, then the heat transmission from the stabilizer to the air and fuel flow can be optimized. In other words, if the stabilizer portion is set with an angle of 120° or under to the main stream of air and fuel, then the air flow speed is reduced relatively near the surface of the stabilizer portion, disturbing the heat transmission. If the angle is 160° or over, the heat resistance by the heat conduction is increased, thus the heat transmission from the surface is obstructed. However, if the angle between the stabilizer portion and the support portion is within 120° to 160° as described in this invention, then the heat transmission and heat conduction at both the stabilizer portion and the support portion are well-balanced. This makes it possible to optimize the heat transmission between the stabilizer and the air and fuel gas flow.

The turbulence promoters are used to accelerate heat transmission by means of the vortex and very small drift current in the flow formed behind those turbulence promoters. If the height of those turbulence promoters is set to 1 mm or over, then the vortex and drift current become large in scale, degrading the effect of the turbulence promoters. In addition, if the height of the turbulence promoters is set to 0.1 mm or under, no effective turbulence is generated. The height of the turbulence promoters therefore should be set within 0.1 mm to 1 mm as described in this invention to maintain the heat transfer performance of the turbulence promoters at a high level.

The reliability and durability of the gas turbine engine, gas turbine power plant, or cogeneration system can be improved when the stabilizer is incorporated in the gas turbine combustor.

According to this invention, the heat transfer from the gas turbine combustor stabilizer to the fuel and air flowing around the said stabilizer can be accelerated to increase the temperature of the air and fuel flow, as well as to decrease the temperature of the stabilizer. As a result, the stability of combustion can be improved and the stabilizer temperature can be protected from excessive rising in its local portions.

A gas turbine engine, gas turbine power plant, or cogeneration system, each of which is much more improved on the stability of combustion, as well as the durability thereof, can be provided by incorporating therein a gas turbine combustion chamber equipped with the stabilizer of this invention.

The following is a combustion condition checking method to carry out the object of the present invention.

A combustion condition checking method of a combustor which has a premixing burner to jet out premixed gas of fuel and air which are mixed, and a stabilizer to form a circulating flow of combustion gas generated from the combustion of the premixed gas at a downstream side thereof to stabilize the flame formed by the combustion of the premixed gas, is characterized in that the relationship between the stabilizer temperature and the premixed gas combustion conditions is checked beforehand, the stabilizer temperature is measured and the combustion conditions are checked according to the measured stabilizer temperature and the relationship.

Concretely, the relationship mentioned in relation to the combustion condition checking method is considered to be a relationship indicating whether the combustion condition is normal or abnormal according to whether or not the temperature of the stabilizer is within a preset stabilizer temperature or a relationship indicating the relationship between the stabilizer temperature and the premixed gas air-fuel ratio or a relationship between the stabilizer temperature and the NOx concentration in the combustion gas, etc.

The combustion condition checking system to achieve the above-mentioned object, which is used for the combustor equipped with a premixing burner that jets out premixed gas of fuel and air, and a stabilizer that forms a circulating flow of combustion gas generated through combustion of the said premixed gas at a downstream thereof to stabilize the flame formed by the combustion of the premixed gas, is characterized by a means for measuring the temperature of the stabilizer and a means for checking the combustion conditions according to the temperature measured by the stabilizer temperature measuring means and the relationship between a preset temperature of the stabilizer and the combustion conditions of the premixed gas.

The combustion condition checking system mentioned here should preferably have a means for displaying the combustion conditions checked using the combustion condition checking means.

The combustor equipment controller used to achieve the object has the above-mentioned combustion condition checking system and a flow rate operation means for calculating the flow rate of the fluid (said fuel or said air) to be adjusted with the flow adjusting valve used to control at least one of the air and the fuel to be fed to the premixing burner according to the combustion conditions checked using the combustion condition checking means provided in the combustion condition checking system and output the result to the flow adjusting valve.

As mentioned in the prior art section, the combustion conditions can be estimated to a certain level according to the combustion gas temperature at the combustor outlet. The combustion gas at the combustor outlet, however, is kept affected by various factors in the processes up to the outlet after gas is generated in premixed combustion. This is why the combustion gas temperature at the outlet cannot always indicate the combustion conditions accurately. On the contrary, the premixed combustion flame temperature, if it can be measured directly, can indicate the combustion conditions accurately. However, since there is no thermometer that can measure such high flame temperatures, no means has been provided so far to check the combustion conditions according to the premixed combustion flame itself.

To solve this problem, this invention checks the combustion conditions according to the temperature of the stabilizer used to stabilize premixed combustion flames. The stabilizer stabilizes premixed combustion flames by forming a circulating flow of the combustion gas generated in the premixed combustion at a downstream side thereof and keeps the temperature high at the downstream side, and ignites the premixed gas at that point. Thus, the stabilizer is exposed to the combustion gas immediately after it is generated by premixed combustion, so the premixed combustion flame temperature can be indicated accurately, and the combustion conditions can be known accurately from the stabilizer temperature. In addition, since the stabilizer temperature is evidently lower than the premixed combustion flame temperature, a thermometer can measure this temperature actually.

The inventors have found that a certain relationship exists between this stabilizer temperature and the air-fuel ratio, which is one of the indexes for the combustion conditions. With this relationship, the air-fuel ratio of the premixed gas can be known accurately to control the air-fuel ratio of the premixed gas.

The stabilizer stabilizes premixed combustion flames by forming a circulation of premixed combustion gas at a downstream side of the stabilizer, so that it is exposed to the combustion gas immediately after the gas is generated in premixed combustion. So, this invention allows the temperature of the combustion gas to be measured immediately after it is generated. This is why this invention allows the combustion conditions to be known accurately.

DETAILED DESCRIPTION OF THE PREFERRED EMBODIMENTS

Embodiment 1

Figure 1:
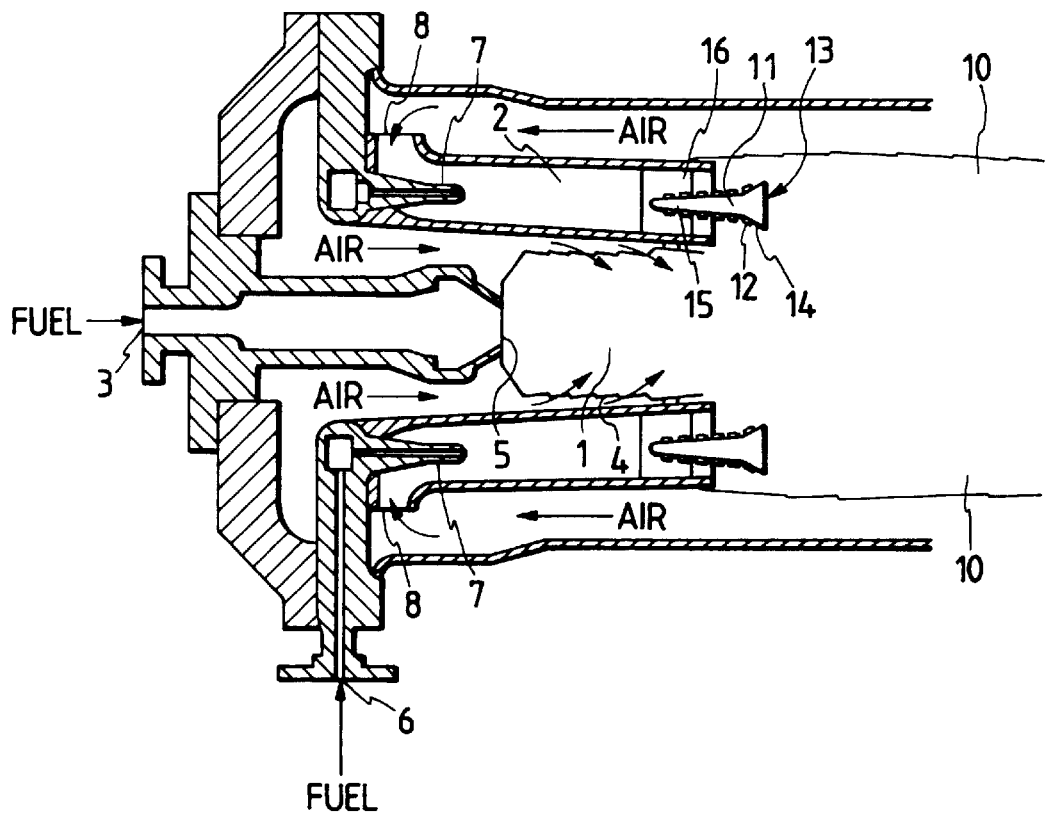
FIG. 1 is a cross-sectional view of the gas turbine combustor in a first embodiment of this invention.

FIG. 1 shows an embodiment of this invention. In FIG. 1, which shows a cross section of a gas turbine combustor equipped with a stabilizer, the stabilizer 11 is ring-like in shape. Combustion is made in two combustion chambers 1 and 10. In the combustion chamber 1, fuel and air make diffusing combustion. In the combustion chamber 10, fuel and air are mixed in a premixing chamber 2 before combustion and then burned to effect premixed combustion. The air compressed in a compressor (not shown in this figure) is distributed as specified and fed into the combustion chamber 1 and the premixing chamber 2 from air inlets 4 and 8, respectively. The air is also used to cool the combustion chamber wall, but the explanation for this purpose is omitted here. The fuel is fed into the combustion chamber 1 from the fuel pipe 3 and into the premixing chamber 2 from the fuel pipe 6 through a fuel nozzle 7 respectively. The stabilizer 11 is fixed at the outlet of the premixing chamber 2 with support members 16.

Figure 2:
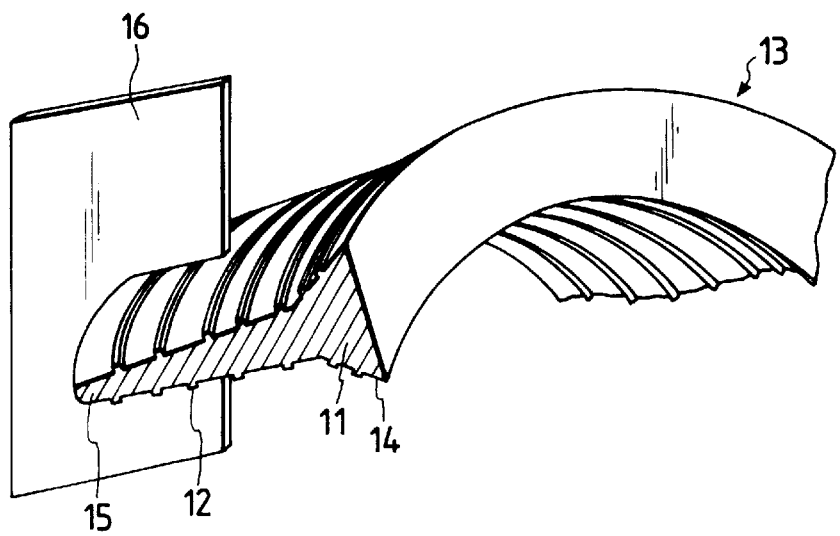
FIG. 2 is a perspective view of a part of the cross section of the stabilizer in an embodiment of this invention.

FIG. 2 shows part of the ring-shaped stabilizer 11 shown in FIG. 1. The stabilizer 11 comprises a flame holder (stabilizer portion) 14 that has a combustion gas heating surface 13 (which is a heat-receiving surface contacting with combustion gas), and a support portion 15 connected to the stabilizer portion. Turbulence promoters 12 are arranged on the surface of the stabilizer 11 except for the heating surface 13. The stabilizer 11 in this embodiment is arranged at the center of the outlet of the premixing chamber 2 shown in FIG. 1 using plate-shaped support members 16. The stabilizer may be arranged freely in another method.

Figure 3A:
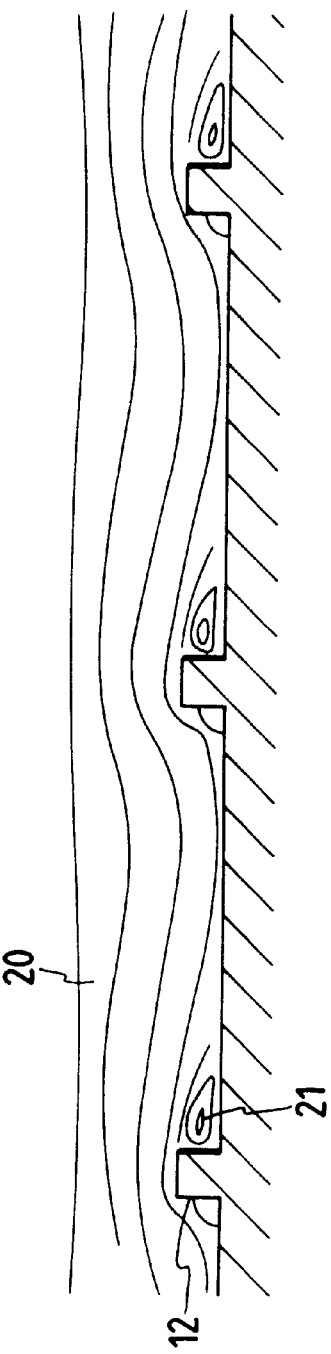
FIGS. 3(a) to 3(d) each are a sectional view of a cross section form of a turbulence promotor.
Figure 3B:
Figure 3C:
Figure 3D:
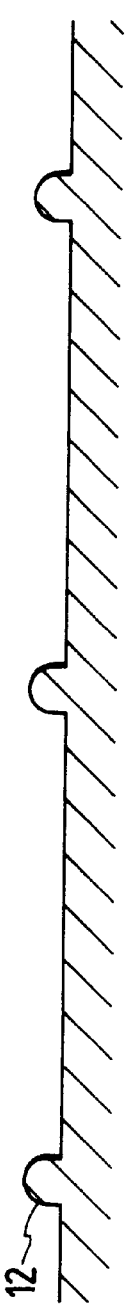

FIGS. 3(a) to 3(d) each show an example of the cross section of the turbulence promoters 12. FIG. 3(a) shows the cross section as a rectangular, FIG. 3(b) shows the cross section as a trapezoid, FIG. 3(c) shows the cross section as a triangle, and FIG. 3(d) shows the cross section as a semi-circle. The effect of this invention is almost the same in any cross section forms of the turbulence promotor. Each turbulence promotor has some ribs as shown in the figures to disturb the air flow.

FIG. 3(a) also shows a typical example of flow lines formed by the air and fuel flowing around the turbulence promotor 12. A swirling area 21 is formed in the lower stream of the turbulence promotor 12. When turbulence promoters are arranged on the surface of the stabilizer of a gas turbine combustor, then much care should be paid to the size of this circulating area 21. In other words, if the circulating area 21 is near the heating surface 13 in FIG. 2, then the flames to be formed usually only in the downstream of the heating surface 13 flash back up to the turbulence promotor 12 due to a change of the air flow caused by a change of load. As a result, the combustor may be damaged. The inventors have found that this flash back problem can be avoided if the distance between the turbulence promotor 12 closest to the heating surface 13 and the heating surface 13 itself is set to more than 4 times the height H of the turbulence promotor according to the size of the vortex 21 formed in the downstream of the turbulence promotor 12 and the air and fuel flow speed set according to the operation range of the gas turbine combustor. The pitch of the turbulence promoters may be 5 to 15 times, for example, 10 times the height H. If the height H is 1 mm or less, the heat transmission is better than when it is 1 mm or more. However, if the height H is 0.1 mm or less, no effect is obtained from the turbulence promoters provided.

Figure 4A:
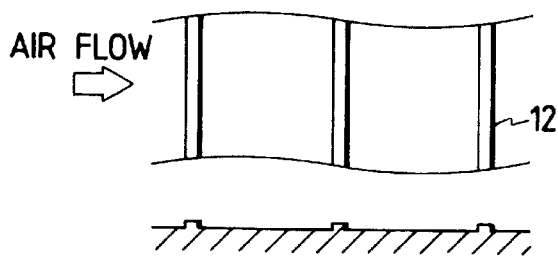
FIGS. 4(a) to 4(e) each are an arrangement of turbulence promoters.
Figure 4B:
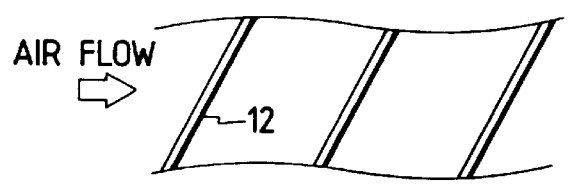
Figure 4C:
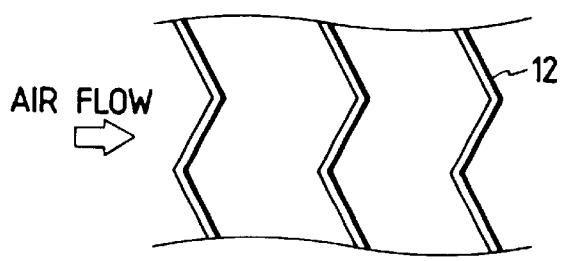
Figure 4D:
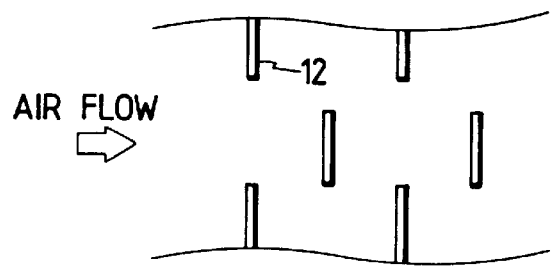
Figure 4E:
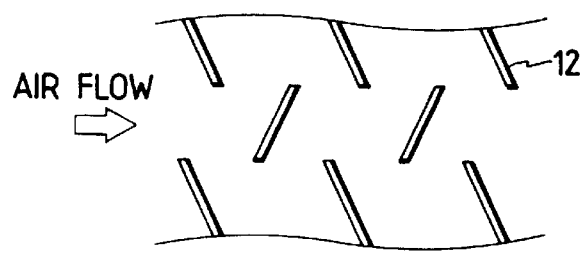

FIGS. 4(a) to 4(e) each show an example of an arrangement of the turbulence promoters 12 on the surface of the stabilizer 11. In FIG. 4(a), rectangular turbulence promoters 12 are arranged perpendicularly to the air flow. This will be suitable for the stabilizer 11 to be manufactured by machining. For the stabilizer to be manufactured by forging, the turbulence promoters 12 can be declined to the air flow as shown in FIG. 4(b), zigzagged as shown in FIG. 4(c), divided in the circumferential direction of the stabilizer 11 as shown in FIG. 4(d), or divided in the circumferential direction of the stabilizer 11 and angled to the air flow. Such way, the heat transmission from the stabilizer 11 to the air and fuel flow, which is a purpose of this invention, can be improved by arranging the turbulence promotors 12 with an angle to the air flow and dividing them at small pitches.

The cross section form and arrangement of the turbulence promotors 12 shown in FIGS. 3(a) to 3(d) and FIGS. 4(a) to 4(e) can be determined freely according to the balance between the heat transmission and the easiness to manufacture independently of those shown in the embodiments of this invention.

The stabilizer 11 in FIG. 2 comprises the stabilizer portion 14 that includes the combustion gas heating surface 13, and the support portion 15, as mentioned above. The support portion 15 is arranged in parallel to the main stream of the air and fuel flow or preferably with an angle of 30° or under to the air and fuel flow and with enough length. The air and fuel flow is usually disturbed significantly, but in this status it is difficult to accelerate the heat transmission by the turbulence promotor 12 effectively. In this embodiment, the air flow, rectified while it flows along the support portion 15 of the stabilizer 11, reaches the stabilizer portion 14. The turbulence promoters 12 are arranged for both the support portion 15 and the stabilizer portion 14. However, since the temperature on the stabilizer portion 14 is higher than that on the support, the heat transmission will be accelerated more effectively if the turbulence promoters 12 in this section work effectively. The support portion 15 that functions as a rectifier may be separated from the stabilizer portion 14 or they may be arranged closely or in contact with each other. However, as shown in FIGS. 1, 2, it is more desirable that the support portion 15 and the stabilizer portion 14 should be united into one. In this status, the heat would be conducted more effectively from the stabilizer portion 14 that includes the high temperature heating surface 13 to the support portion 15, and the heat from the support portion 15 is also transmitted to the air and fuel flow more effectively.

Figure 5:
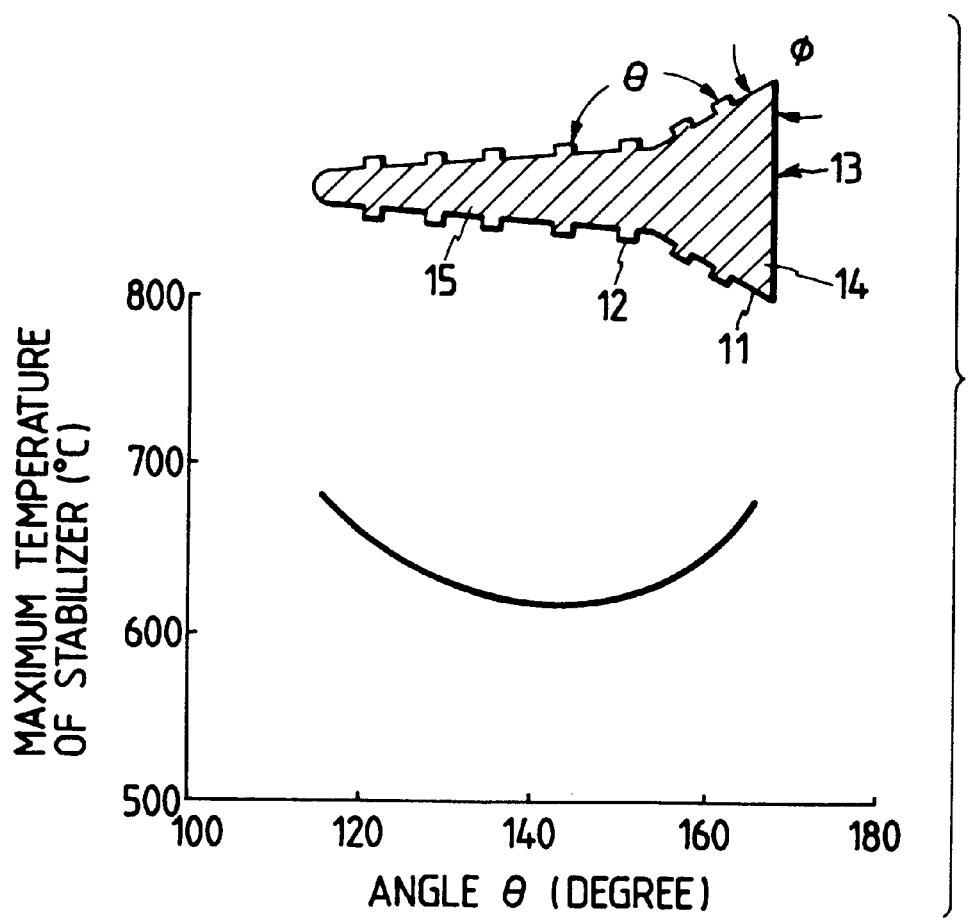
FIG. 5 is an illustration showing stabilizer's heat transmission performance.

It is known through experiments that the angle φ between the heating surface 13 of the stabilizer 11 and the surface of the stabilizer portion 14 exposed to the fuel and air flow should be within 20° to 70° to stabilize the combustion in the gas turbine combustor. FIG. 5 shows the relationship between the angle θ between the stabilizer portion 14 and the support portion 15, and the maximum temperature in the stabilizer portion 14. The angle φ is assumed to be 45° in the stabilizer 11 whose cross section form is as shown in FIG. 2. The efficiency of the heat transmission from the stabilizer 11 to the fuel and air flow is determined by the heat transmission between them and by the heat conductivity in the stabilizer 11. FIG. 5 also shows that if the angle θ is within 120° to 160°, the heat transmission and the heat conductivity are well-balanced and the transmitted calorific value is maximized. The relationship between the angle θ and the maximum temperature in the stabilizer portion as shown in FIG. 5 can also be satisfied even when the angle φ is an angle other than 45° within 20° to 70°.

Figure 6:
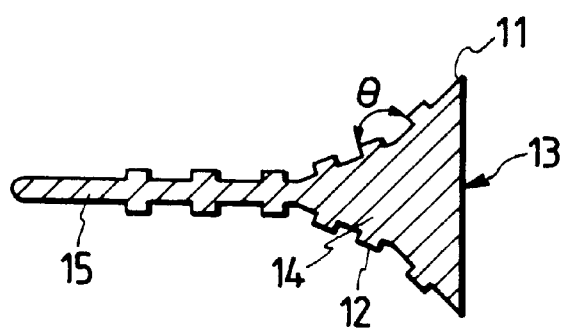
FIG. 6 is a cross-sectional view of the stabilizer in an embodiment of this invention.

The stabilizer may also be structured as shown in FIG. 6 so that the angle θ may be set within 120° to 160°. In other words, the support portion 15 closer to the stabilizer portion 14 is angled so as to be widened toward the stabilizer portion 14 and connected to it.

According to this embodiment, the turbulence promoters can function surely to transmit heat from the stabilizer to the air and fuel flow.

Embodiment 2

Figure 7:
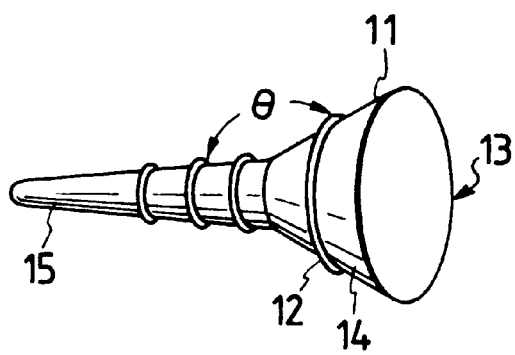
FIG. 7 is a perspective view of the stabilizer in the second embodiment of this invention.
Figure 8:
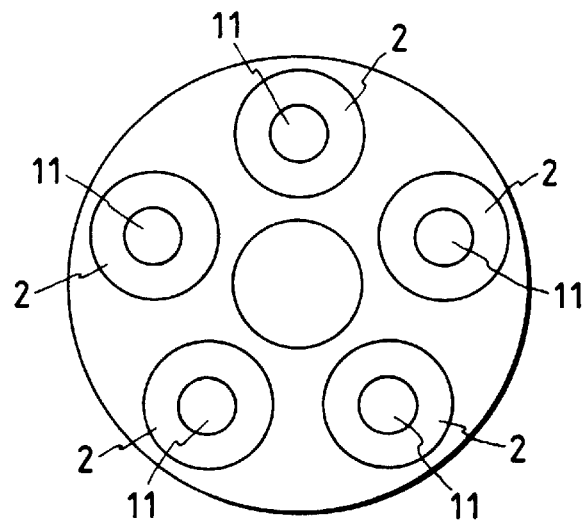
FIG. 8 is an illustration for location of the stabilizer shown in FIG. 7 in relation to the premixing chamber.

FIGS. 7 and 8 show another embodiment of this invention. The stabilizer 11 in this embodiment is not used for a ring-shaped premixing chamber as shown in FIG. 1, but it is used for a cylinder-shaped premixing chamber. As a whole, its shape is like a pin as shown in FIG. 7. It comprises a stabilizer portion 14 that has a heating surface 13, and a support portion 15. Turbulence promoters 12 are provided on the surfaces of the stabilizer portion 14 and the support portion 15 of the stabilizer 11. Just like the embodiment 1, the turbulence promoters 12 may take various cross section forms as shown in FIGS. 3(a) to 3(d) and they may be arranged freely on the stabilizer surface as shown in FIGS. 4(a) to 4(e). And just like the embodiment 1, the distance between the turbulence promotor 12 closest to the heating surface 13 and the heating surface 13 should be more than 4 times the turbulence promotor height H so that the flame may not flash back to the turbulence promotor 12 and damage the combustor due to a flow change caused by a load change, etc., as well as the height H of the turbulence 12 should be within 0.1 mm to 1 mm.

In this embodiment, also, it is necessary for the stabilizer 11 that the angle φ between the heating surface 13 and the surface of the stabilizer portion 14 exposed to the fuel and gas flow be within 20° to 70°. With this angle φ, the relationship between the angle θ between the stabilizer portion and the support portion 15, and the maximum temperature in the stabilizer 11 is satisfied just as shown in FIG. 5. Thus, the angle θ between the stabilizer portion 14 and the support portion should preferably be within 120° to 160°. And just as shown in the embodiment 1, the stabilizer cross section may be structured as shown in FIG. 6. In other words, the support portion 15 closer to the stabilizer portion 14 may be angled so as to be widened toward the stabilizer portion and connected to it.

FIG. 8 shows the stabilizers 11 arranged in relation to the premixing chambers 2. The premixing chambers 2 are arranged in an annular form with spacing therebetween. The stabilizers 11 each may be fixed with a support plate as shown in FIG. 2 or with any other means. The center circle shown in FIG. 8 shows a pilot burner. Also in this embodiment, the turbulence promoters mentioned in the embodiment 1 are effective to assure the heat transmission performance to improve combustion stability, as well as to prevent the stabilizer temperature from rising excessively in its local portions. According to this embodiment, the turbulence promoters can be arranged for the stabilizer of a gas turbine combustor that has a plurality of premixing chambers.

Embodiment 3

Figure 9:
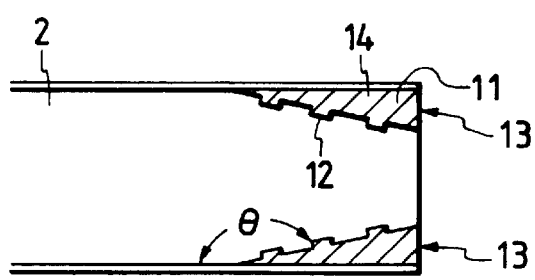
FIG. 9 is a cross-sectional view of the premixing chamber equipped with a stabilizer in the third embodiment of this invention.

FIG. 9 shows the cross section of the stabilizer in another (third) embodiment of this invention. The stabilizer 11 in this embodiment is provided on the inner periphery of the premixing chamber 2. The premixing chamber 2 may be a ring-shaped one as shown in FIG. 1 or a cylinder-shaped one as shown in FIG. 8. Of course, the stabilizer form is changed according to the premixing chamber type. For the ring-shaped premixing chamber shown in FIG. 1, the stabilizer in this embodiment comprises two ring-shaped members, one of which is arranged on the inner periphery inner wall and another is arranged on the outer periphery inner wall. For the cylinder-shaped premixing chamber shown in FIG. 8, the stabilizer in this embodiment comprises one ring-shaped member.

In any cases, the stabilizer 11 in this embodiment comprises the stabilizer portion 14 only. The support portion is omitted in this embodiment. The fuel and air flow in this embodiment is rectified in the contraction process at the stabilizer portion 14, so the turbulence promoters 12 provided on the stabilizer can function surely to transmit heat effectively.

Just like in the said embodiments, the turbulence promoters 12 provided on the surface of the stabilizer 11 can take any cross section forms as shown in FIGS. 3(a) to 3(d), as well as they can be arranged freely as shown in FIGS. 4(a) to 4(e). Just like the said embodiments, the distance between the turbulence promotor 12 closest to the heat receiving surface 13 and the heat receiving surface 13 should also be more than 4 times the height H of the turbulence promoters 12, and the height H of the turbulence promoters 12 should be within 0.1 mm to 1 mm so that the flame may not flash back to the turbulence promotor 12 to damage the combustor due to a flow change caused by a load change, etc.

If the angle between the inner wall of the premixing chamber 2 and the surface of the stabilizer is assumed to be θ in this embodiment, then the relationship between the angle and the maximum temperature on the stabilizer will become as shown in FIG. 5. Therefore, the angle between the surface of the stabilizer portion 14 and the inner wall surface of the premixing chamber should preferably be within 120° to 160°. The stabilizer taper angle may also be changed at a middle point to secure the angle θ within 120° to 160°. In this case, the angle θ is not the angle between the inner wall surface of the premixing chamber and the stabilizer, but the angle between two crossed curved surfaces that form the surface of the stabilizer.

The turbulence promoters can function surely to transmit heat to improve the stabilization of combustion, as well as to prevent the stabilizer temperature from rising excessively in its local portions in this embodiment, as well. In addition, according to this embodiment, the stabilizer can be fixed at the premixing chamber surely, so that thermal deformation of the stabilizer can be reduced.

If a gas turbine combustor equipped with the stabilizer of this invention is combined with a gas turbine driven by combustion gas generated in the gas turbine combustor and an air compressor, etc. connected to the gas turbine rotary shaft in a well-known method, then a gas turbine engine, which is much more improved in reliability and durability, can be provided.

If a gas turbine combustor equipped with the stabilizer of this invention is combined with a gas turbine driven by the combustion gas generated in the gas turbine combustor, a generator for generating electric power by drive of the gas turbine, etc., then a gas turbine power plant, which is much more improved on reliability and durability, can be provided.

Figure 10:
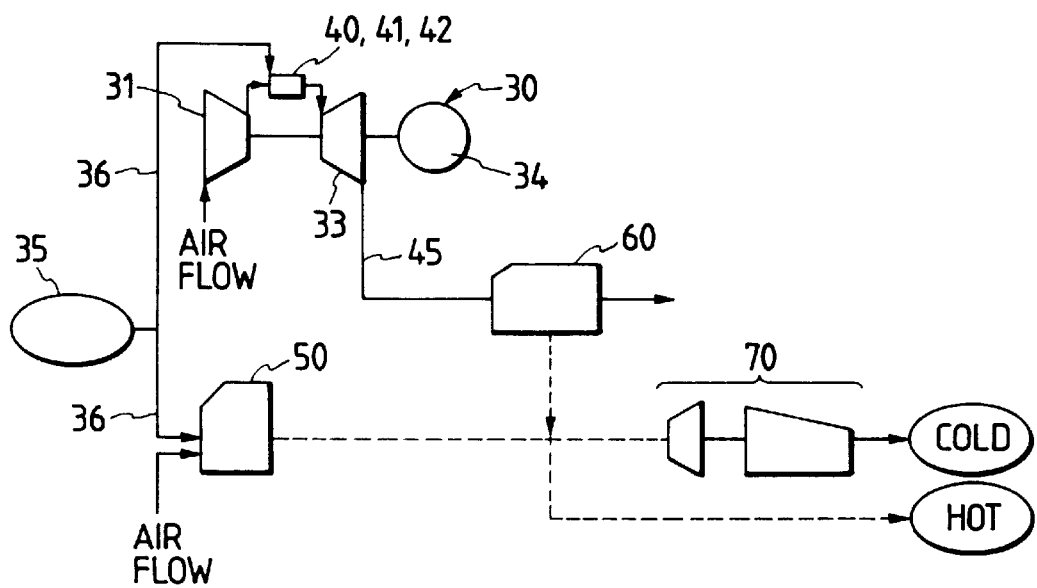
FIG. 10 is a cogeneration system block diagram.

If a gas turbine combustion chamber equipped with the stabilizer of this invention is combined with a gas turbine driven by the combustion gas generated in the gas turbine combustor, a generator for generating electric power by drive of the gas turbine, an exhaust heat recovery boiler used to generate steam by the heat of combustion gas exhausted from the gas turbine, etc., as shown in FIG. 10, then a cogeneration system, which is much more improved on reliability and durability, can be provided.

The cogeneration system shown in FIG. 10 is equipped with a gas turbine generator 30 that comprises an air compressor 31, gas turbine combustors 40, 41, and 42, a gas turbine 33 and a generator 34, a main boiler 50, a fuel feeder 35 used to feed fuel 36 to the gas turbine combustors and the main boiler, an exhaust heat recovery boiler 60, and a turbo cooler 70.

The combustion gas generated in the gas turbine combustors 40, 41, and 42 is fed to the gas turbine 33 to drive the turbine and generate power, then fed to the exhaust gas recovery boiler 60 to generate steam. The steam is used to drive the turbo cooler 70 in summer and used for heating in winter. When this steam is insufficient, the steam generated in the main boiler 50 is used for the same purposes.

Embodiment 4

Hereafter, other various embodiments of this invention will be explained.

At first, a fourth embodiment of this invention will be explained using FIGS. 11 through 16.

Figure 12:
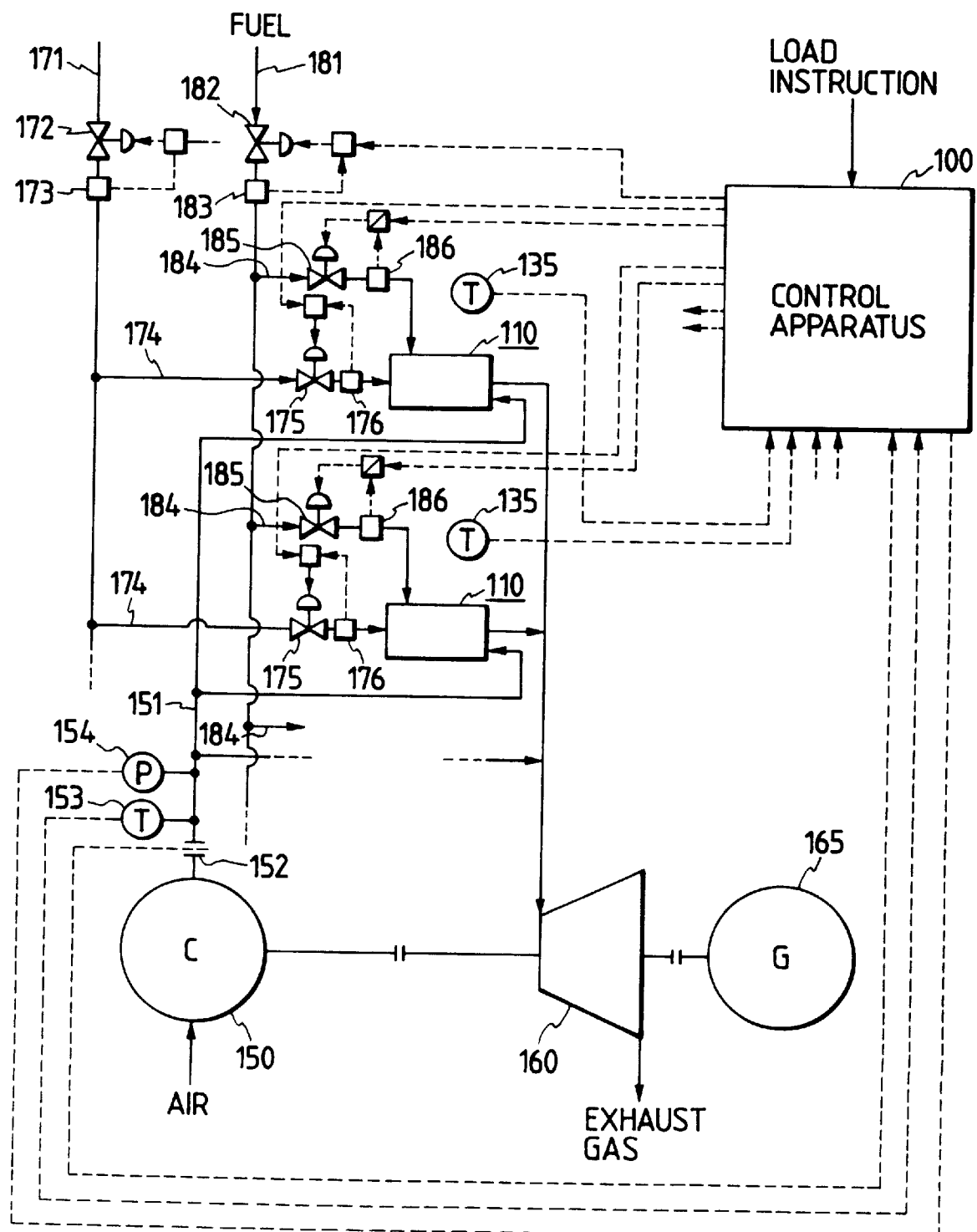
FIG. 12 is a system diagram of the gas turbine equipment in the fourth embodiment of this invention.

As shown in FIG. 12, a gas turbine equipment in this embodiment is equipped with an air compressor 150, multiple combustors 110 that use the air compressed in an air compressor 150, a gas turbine 160 driven by the combustion gas exhausted from the combustors 110, a generator 165 driven by the gas turbine 160, and a controller 100 used to control those devices.

Figure 11:
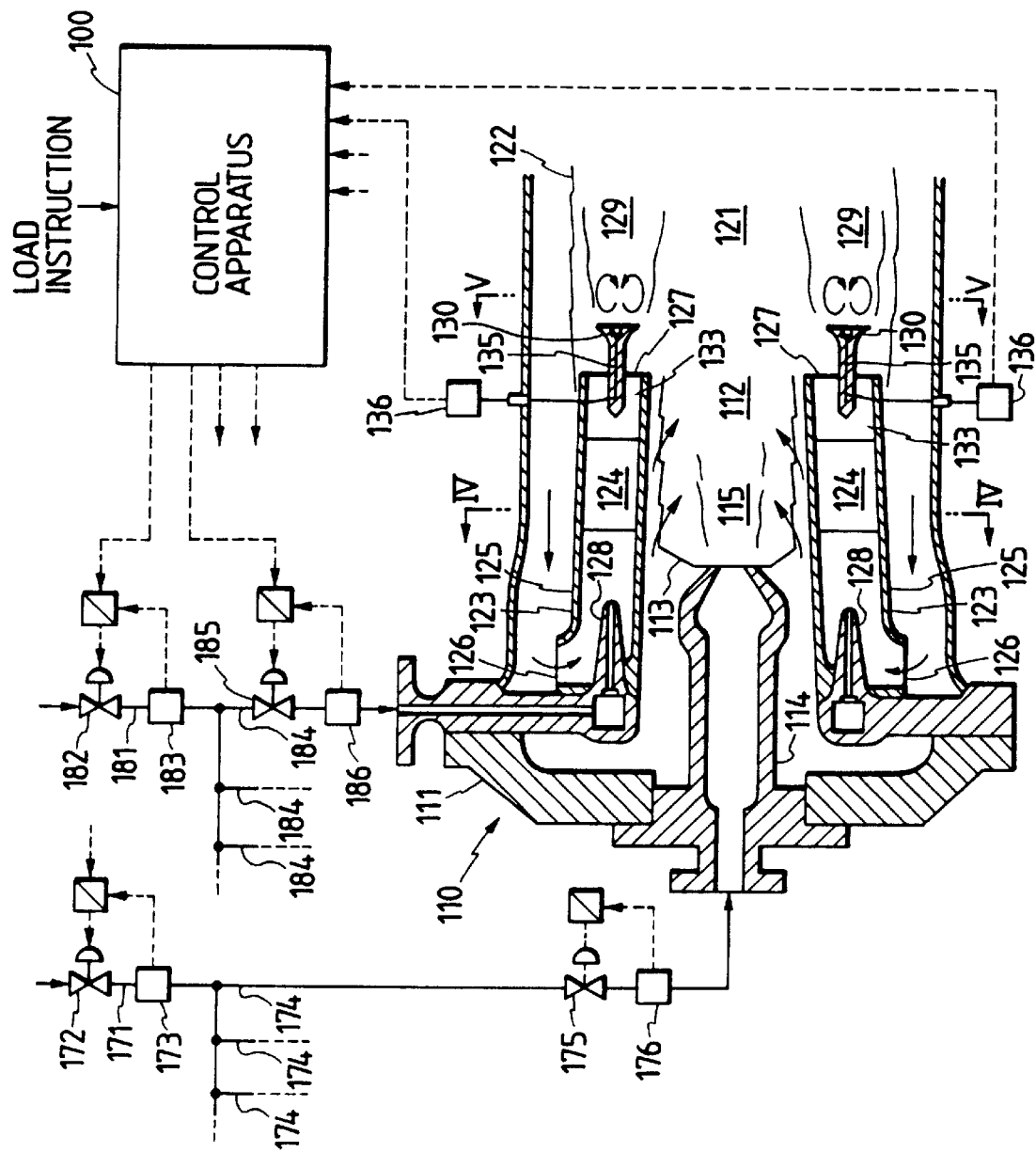
FIG. 11 is a diagram for explaining the stabilizer in the fourth embodiment of this invention and the stabilizer configuration.

Each combustor 110, as shown in FIG. 11, comprises a cylinder-shaped combustor casing 111, a primary combustion cylinder 113 forming a primary combustion chamber 112, a secondary combustion cylinder 122 forming a secondary combustion chamber 121 and located downstream of the primary combustion cylinder 113, a diffusion burner 114 used to jet out fuel into the primary combustion chamber 112, a premixing burner 123 used to jet out fuel into the secondary combustion chamber 121, a stabilizer 130 used to stabilize the premixed combustion flame 129 formed by premixed gas combustion.

Figure 14:
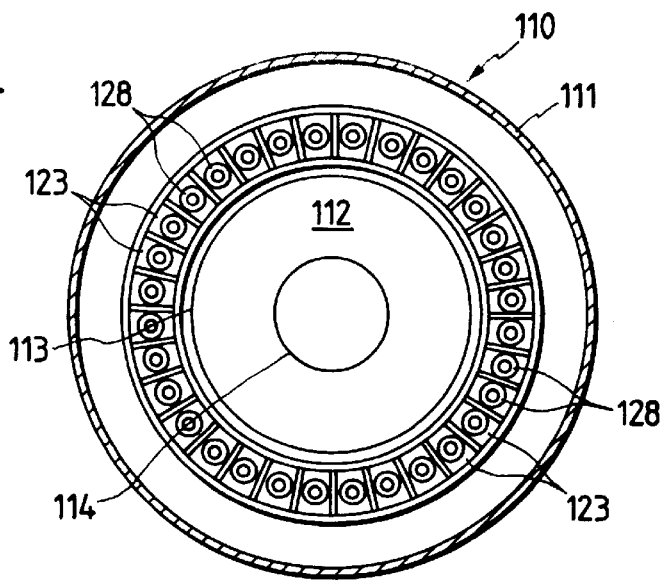
FIG. 14 shows the cross section of the IV—IV line shown in FIG. 11.
Figure 15:
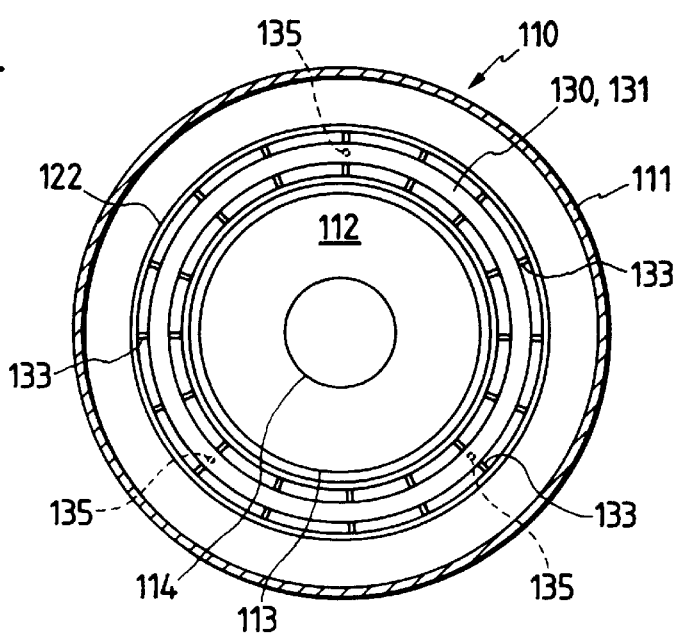
FIG. 15 is a cross-sectional view of a V—V line shown in FIG. 11.

The diffusion burner 114 is provided on the center axis of the cylinder-shaped combustion chamber casing 111. The primary combustion cylinder 113 is also located on the center axis of the cylinder-shaped combustor casing 111 and at the downstream side of the diffusion burner 114. Multiple premixing burners 123 are provided around the primary combustion cylinder 113 in a ring-like pattern as shown in FIGS. 14 and 15. The premixing burner 123, as shown in FIG. 11, has a fuel nozzle 128 and a premixing chamber unit 125 that forms a premixing chamber 124 used to mix fuel and air. The premixing chamber unit 125 has an air intake 126 used to intake the air into the casing 111, which is located at the end of the upstream of the unit 125. In the downstream of the unit 125, a jet port 127 used to jet out premixed gas is provided. A fuel nozzle 128 is provided upstream of the premixing chamber 124.

Figure 16:
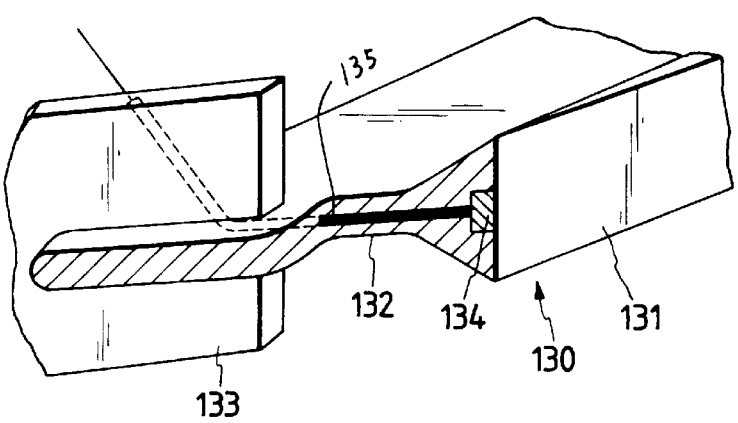
FIG. 16 is a perspective view of the stabilizer in the fourth embodiment of this invention.

The stabilizer 130, as shown in FIGS. 11 and 16, comprises a stabilizer portion 131 of which cross section forms almost an isosceles triangle, and a support portion 132 used to support the stabilizer portion 131. The stabilizer portion 131, of which the apex faces to the upstream side and of which the bottom faces to the downstream side, is supported by the support portion 132 at its bottom so that the bottom may be located at the downstream of the jet port 127 of the premixing burner 123. The stabilizer portion 131, as shown in FIG. 15, has a projected ring-like shape at its both ends in the upstream and downstream sides corresponding to the multiple premixing burners 123, arranged in a ring-like pattern so that the premixed gas jet out from the premixing burners 123 may be divided into the inner and outer peripheries. The stabilizer 130 is fixed by multiple support plates 133 provided in radial directions in the premixing burner 123. Multiple thermo couples 135, are embedded in the stabilizer 130. They are used to measure the temperature at the bottom of the stabilizer portion 131 (near the heating surface) as shown in FIG. 16. The holes to embed those thermo couples 135 in the stabilizer are filled up with silver solder or nickel solder 134. The multiple combustors 110 for a gas turbine 160 are usually formed in the same shape. Thus, preferably, a thermometer (thermo couple) 135 for each combustor should be located in the same position for proper correspondence of stabilizer temperatures mutually. Those thermoelectric couples 135 are connected to a transmitter 136 provided outside the casing using signal lines, as shown in FIG. 11. The signals from this transmitter 136 are inputted to the controller 100.

A compressed air duct 151 is provided between the air compressor 150 and each combustor 110 as shown in FIG. 12. The duct 151 is used to feed compressed air from the compressor 150 to each combustor 110. This compressed air duct 151 is provided with a thermometer 153 used to measure the temperature of the compressed air, a pressure meter 154 used to measure the air pressure, and a flow meter 152 used to measure the air flow. The air flow meter 152 may be a hot wire mass flow meter, a Pitot-tube flow meter, an orifice flow meter, or any other type flow meter. The signals from the thermometer 153, the pressure meter 154, and the air flow meter 152 are inputted to the controller 100.

Figure 13:
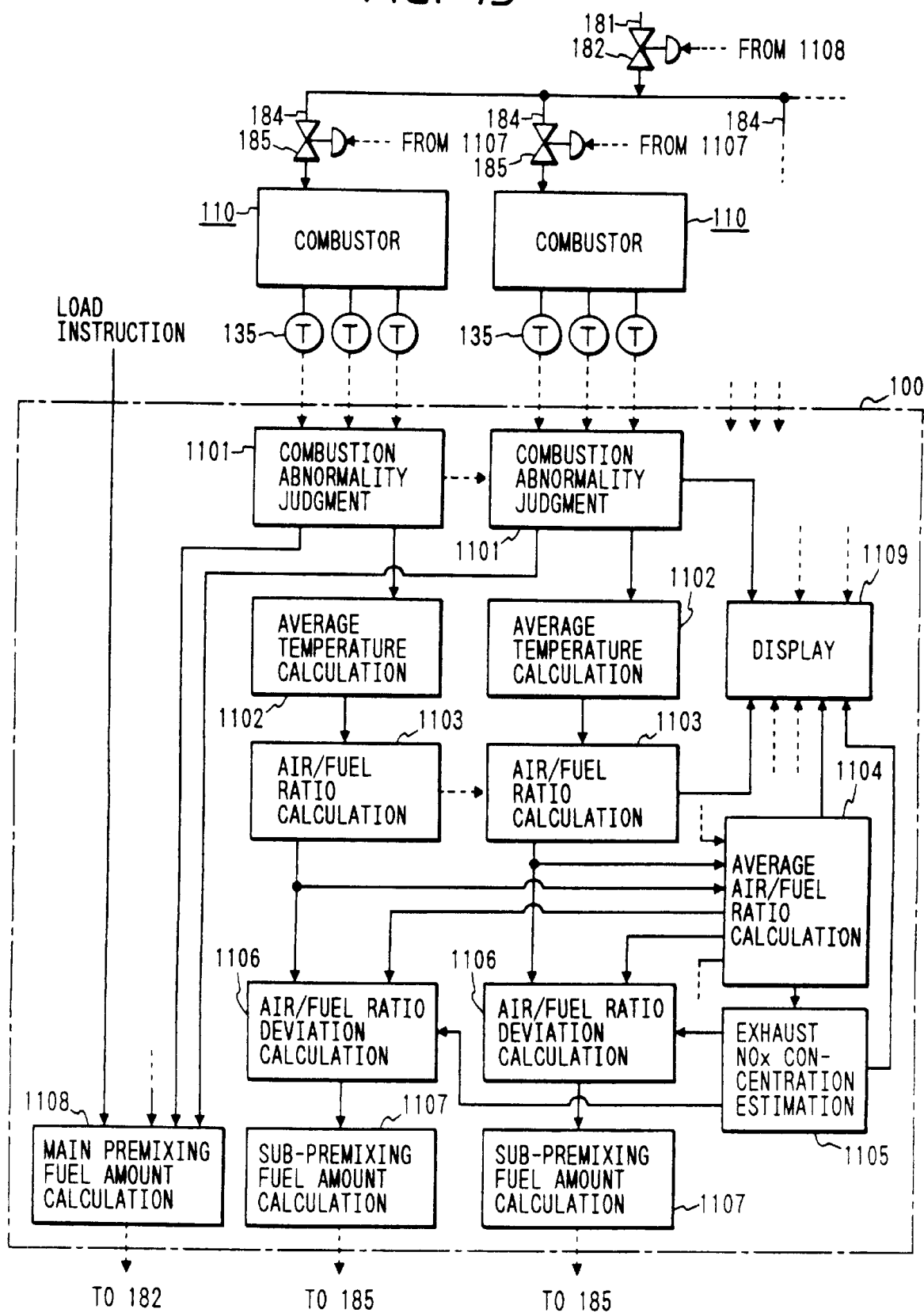
FIG. 13 is a functional block diagram of the controller in the fourth embodiment of this invention.

The fuel pipe used to feed fuel to the multiple combustors 110, as shown in FIG. 12, comprises a main diffusion fuel pipe 171, multiple sub diffusion fuel pipes 174, used to feed fuel to the diffusion burners 114 of the combustors 110 branched from the main diffusion fuel pipe 171, a main premixed fuel pipe 181, multiple sub premixed fuel pipes 184, branched from the main premixed fuel pipe 181 and used to distribute premixed fuel to each combustor 110, and multiple premixing burner fuel pipes branched from the sub premixed fuel pipe 184 and used to distribute premixed fuel to each premixing burner 123 in one combustor 110. In FIGS. 11 through 13, however, the premixing burner fuel pipes are omitted. The fuel distributed to each fuel pipe is the same fuel. In this embodiment, the fuel is gas. Fuel flow meters 173, 176, 183, and 186, as well as fuel adjusting valves 172, 175, 182, and 185 are provided to the main diffusion fuel pipe 171, sub diffusion fuel pipe 174, main premixed fuel pipe 181, and sub premixed fuel pipe 184, respectively. The opening of each of the fuel adjusting valves 172, 175, 182, and 185 are controlled by the signals from the controller 100 so that the flow in each pipe may be controlled.

The controller 100, as shown in FIG. 13, comprises multiple combustion abnormality judgment units 1101 used to judge whether the combustion is normal or abnormal in each combustor according to the temperature at each measuring point of the stabilizer detected by thermoelectric couples 135 provided in the combustors 110, average temperature arithmetic units 1102 used to calculate the average value of the temperatures in the stabilizer measured at the measuring points by multiple thermoelectric couples 135, each provided in a combustion chamber, an air-fuel ratio arithmetic unit 1104 used to calculate the average value of the air-fuel ratio for the combustors 110, air-fuel ratio deviation arithmetic units 1106 used to calculate the average value of the deviation between the average air-fuel ratio and the air-fuel ratio of each combustor 110, sub-premixed fuel amount arithmetic units 1107 used to calculate the fuel amount to be fed to a sub-premixed fuel pipe 184 according to the air-fuel ratio deviation of each combustor 110 and output the result to a sub-premixed fuel adjusting valve 185, the main premixed fuel amount arithmetic unit 1108 used to calculate the fuel amount to be fed to the main premixed fuel pipe 181 according to the load signal from external and output the result to the main premixed fuel adjusting valve 182, an exhaust NOx concentration estimator 1105 used to estimate the exhaust NOx concentration from the average air-fuel ratio, and a display unit 1109 used to display combustion error judgment results, the air-fuel ratio of each combustor 110, the average air-fuel ratio, the exhaust NOx concentration, etc. In addition to the devices mentioned above, the controller 100 is also equipped with a diffusion fuel amount arithmetic unit, etc. used to calculate the amount of the said diffusion fuel to be controlled by the adjusting valves 172, 175.

The above is a controller software construction or the controller 100. Actually, the controller 100 in this embodiment is constructed in a computer. The display 1109 is constructed of a display unit and the other parts or units for other functions are constructed of ROM and RAM storing data and programs, and a CPU used to process and execute those data and programs.

Next, the operation of this embodiment will be explained below.

The air for combustion is compressed in the compressor 150, then fed to each combustor 110 through the compressed air duct 151. Part of the air fed to the combustor 110 is fed directly into the primary combustion chamber 112, and part of the rest is fed into the premixing chamber 124 of the premixing burner 123. Furthermore, part of the air is also used to cool the primary combustion cylinder 113 and the secondary combustion cylinder 122, which are not shown here. On the other hand, the fuel used for premixed combustion is fed to the fuel nozzle 128 of the premixing burner 123 through the main premixed fuel pipe 181, each sub premixed fuel pipe 184 provided for each combustor 110, and each premixing burner pipe provided for each premixing burner 123. The fuel used for diffusion combustion is fed to the diffusion burner 114 through the main diffusion fuel pipe 171 and the sub diffusion fuel pipe 174 provided for each combustor 110.

The air and fuel fed into the primary combustion chamber 12 are diffused and burnt In the chamber. The high temperature combustion gas generated from this diffusion combustion is flown into the primary combustion chamber 112 and used to stabilize the premixed combustion flame 129 formed in the chamber.

The fuel jet out from the fuel nozzle 128 of the premixing burner 123 is mixed with the air fed to the nozzle 128. The fuel is then jet out into the secondary combustion chamber 121 from the jet port 127 of the burner 123 for premixed combustion. The combustion gas generated through this combustion is circulated into the downstream side of the stabilizer 130, causing the temperature at the downstream side of the stabilizer 130 to rise high. The stable premixed combustion flame 129 is thus formed at the downstream side of the stabilizer 130.

The combustion gas generated in each combustor is fed into the gas turbine 160 to drive the turbine. Then, this gas turbine drives the power generator 165.

The temperature of the stabilizer 130 measured by the thermoelectric couple 135 is outputted to the controller 100 by the transmitter 136. The temperature signal is used to control premixed fuel.

This section will explain how premixed fuel is controlled according to the temperature of the stabilizer 130.

The combustion conditions in each combustor 110 are usually represented by an air-fuel ratio. The inventors have found that the relationship between this air-fuel ratio and the temperature of the stabilizer 130 can be roughly represented by the following formula. In other words, since the air-fuel ratio can be calculated from the temperature of the stabilizer 130, the combustion conditions can be known from the temperature of the stabilizer 130.

$$Tf = T0 + k1 \cdot Ta - k2 \cdot 1n(\lambda) \qquad \text{(Formula 1)}$$

Where, the symbols have the following meanings:
Tf: Stabilizer temperature (0° C.), T0: Constant (° C.), Ta: Temperature of the air flown into the combustor 110 (° C.), k1: Constant (-), k2: Constant (° C.),:λ Air-fuel ratio (-).

The constants differ among the operation conditions and structures of the combustor 110. So, it is difficult to indicate the concrete temperature of the stabilizer 130 Tf and the air-fuel ratio λ in relation to the temperature Tf. However, an example is shown as follows: If the air-fuel ratio λ (λ=17.4 . . . theoretical air-fuel ratio, the fuel is methane in this case.) is within 29.6 to 33.1, then the stabilizer temperature Tf will be reduced by about 30° C.

The relationship between the air-fuel ratio λ and the exhaust NOx concentration can be roughly represented by the following formula.

$$NOx = k3 - k4 \cdot 1n(\lambda) \qquad \text{(Formula 2)}$$

Where, the symbols have the following meanings:
NOx: Exhaust NOx concentration (ppm), k3: Constant (ppm), k4: Constant (ppm). The formula 2 indicates the relationship between the NOx concentration and the air-fuel ratio. When this formula is combined with the formula 1, a formula to specify the relationship between the NOx concentration and the stabilizer temperature can be obtained as a matter of course.

The controller 100 checks the combustion conditions of each combustor 110 to control premixed fuel using the formula 1 and the formula 2 mentioned above.

Concretely, signals from the thermoelectric couple 135 provided in each combustor 110 are inputted to the controller 100, then the fuel abnormality judging unit 1101 corresponding to the combustor 110 judges whether or not the combustion conditions are normal according to the signals. This judgment is done according to whether or not the temperature of the stabilizer 130 is within the preset lower and upper limit values. The upper limit value is the allowable temperature for the material of the stabilizer 130, for example, it is 800° C. The lower limit value is a value obtained by subtracting the prescribed value, for example, 100° C., from the temperature of the stabilizer 130, which temperature is calculated from the designated air-fuel ratio at a certain load.

If the temperature of the stabilizer 130 exceeds the upper limit value, the stabilizer 130 may begin melting. In the worst case, flash-back may occur. If the temperature of the stabilizer 130 exceeds the lower limit value, a blow off may occur. To prevent this, an alarm signal is outputted to the main premixed fuel amount arithmetic unit 1108 to close the main premixed fuel adjusting valve fully to stop the fuel feeding to each combustor 110 if any of the signals from the thermoelectric couples 135 in the subject stabilizer 110 indicates an abnormal temperature (out of the preset temperature range). The main premixed fuel amount arithmetic unit 1108 usually calculates the fuel amount according to the load signal from external and output the result to the main premixed fuel adjusting valve 182 to control the main premixed fuel amount. Since the main premixed fuel amount (total premixed fuel amount) is controlled independently of the control of the fuel amount for each combustor 110 such way, power generation changes can be prevented even when a time delay or error occurs in the control of fuel amount for each combustor 110.

If the combustion conditions are normal, the temperature of the stabilizer 130 is outputted as it is to the average temperature arithmetic unit 1102. In this arithmetic unit 1102, the average value of the temperatures measured at the measuring points in the stabilizer 130 is calculated. The air-fuel ratio arithmetic unit 1103 calculates the air-fuel ratio of each combustor from the average temperature of the stabilizer using the formula 1. For this air-fuel ratio calculation, the temperature Ta of the air flowing into the combustor 110 is needed. This temperature value is obtained by the thermometer 153 provided in the compressed air duct 151. The average air-fuel ratio arithmetic unit 1104 calculates the average value of the air-fuel ratio values collected from all the combustors 110. This average air-fuel ratio is output to the air-fuel ratio deviation arithmetic unit 1106 to calculate the deviation from the air-fuel ratio of each combustor. This air-fuel ratio deviation is output to the sub premixed fuel amount arithmetic unit 1107 to calculate the sub premixed fuel amount for each combustion chamber that can eliminate this deviation. However, in this case, the total value of the sub premixed fuel amount for every combustor 110 must be assumed as the main premixed fuel amount (total premixed fuel amount) and the total value of the main premixed fuel amount+main diffusion fuel amount must be assumed as the total fuel amount. The sub premixed fuel amount for each combustor is output to the sub premixed fuel adjusting valve provided for each combustor to adjust the fuel amount flowing in the sub premixed fuel pipe 184. The average air-fuel ratio is also outputted to the exhaust NOx concentration estimator 1105. The exhaust NOx concentration is estimated from this average air-fuel ratio using the formula 2. If the estimated result is over the preset upper limit value, the average air-fuel ratio corresponding to the surplus is outputted to each air-fuel ratio deviation arithmetic unit 1106 to lower the exhaust NOx concentration. In addition, the average air-fuel ratio to be calculated next is larger than the air-fuel ratio calculated in the average air-fuel ratio arithmetic unit 1104 (the air is more than the fuel in amount). Each air-fuel ratio deviation arithmetic unit 1106 calculates the deviation between this newly calculated average air-fuel ratio and the air-fuel ratio of each combustion chamber.

If an abnormal combustion is detected in any of the combustion error judging units 1101, the error occurred combustor appears on the display screen 1109. This display screen also outputs the air-fuel ratio of each combustor, the average air-fuel ratio of all the combustors 110 and the exhaust NOx concentration.

Since the combustion condition is checked according to the temperature of the stabilizer 130 such way in this embodiment, this method is actually assumed to be the same as direct measuring of the temperature of the premixed combustion flame 129 formed at the downstream side of the stabilizer 130. This is why it can check the premixed combustion conditions accurately.

If multiple combustors 110 with the same specifications are provided for a gas turbine as shown in this embodiment, then the combustion characteristics will usually differ among combustors depending on the manufacturing error of each combustor, length of the pipe, length of the duct, etc. And if the combustion characteristics differ among combustors such way, the characteristics of the combustion gas (concretely, gas temperature and NOx concentration) exhausted from each combustor 110 will differ as a matter of course. Therefore, the load applied on the blades of the gas turbine 160 is deviated to shorten the working life of the gas turbine 160 and increase the NOx amount exhausted from part of the combustors 110. This will cause the average value of the NOx amount exhausted from all the combustors 110 to be increased. In this embodiment, however, the air-fuel ratio of each combustor is calculated and the result is used to control the air-fuel ratio of each combustor so that the value may become the average air-fuel ratio of all the combustors. The load of each combustor can thus be leveled to avoid the said problems.

If the exhausted NOx concentration exceeds the upper limit value, the average air-fuel ratio is increased so that the air-fuel ratio of each combustor 110 may be controlled to become equal to the average air-fuel ratio. The exhaust NOx concentration can thus be reduced.

In this embodiment, multiple thermo couples 35 are provided for a combustor 110. This is to check the combustion conditions in each combustor 110 accurately. If this accuracy is not needed, only one thermo couple 135 may be provided for a stabilizer 130. In this case, the average temperature arithmetic unit 1102 can be eliminated from the controller.

In this embodiment, the air-fuel ratio of each combustor, as well as the average air-fuel ratio of all the combustors 110 are calculated and displayed. However, since the stabilizer 130 temperature itself indicates the combustion conditions, the sub premixed fuel may be controlled by calculating the stabilizer average temperature of all the combustors 110 from the stabilizer average temperature of each combustion chamber without calculating the air-fuel ratio, and according to the deviation between each combustor stabilizer average temperature and the stabilizer average temperature of all the combustors 110.

Embodiment 5

Next, a fifth embodiment of this invention will be explained using FIG. 17.

This embodiment controls the combustion conditions in each part in each combustor 110. Just like the fourth embodiment, the combustor 110 is provided with multiple premixing burners 123. Each burner has a premixing burner fuel pipe 187 (omitted in FIG. 13 for the fourth embodiment) for each burner. In this embodiment, however, the premixed fuel to be fed to each premixing burner 123 in a single combustor 110 is controlled. The sub premixed fuel amount to be fed to each combustor 110 is not controlled just like in the fourth embodiment. A premixing burner fuel adjusting valve 188 is provided to the premixing burner fuel pipe 187.

A controller 100a comprises a combustion error judging unit 1101 used to judge whether or not the combustion in each combustor 110 is normal according to the temperature of the stabilizer 130 detected by the thermo couple 135 provided in the combustor 110, an air-fuel ratio arithmetic unit 1103*a* used to calculate the air-fuel ratio in the fuel area corresponding to the temperature detecting position from the temperature measured at the measuring points in the stabilizer 130, detected by any of the multiple thermo couples 135, air-fuel ratio deviation arithmetic units 1106*a* used to calculate the deviation between the said average air-fuel ratio and the air-fuel ratio of the fuel area corresponding to the temperature detecting point, premixing burner fuel amount arithmetic units 1107*a* used to calculate the premixed fuel amount for each premixing burner according to the air-fuel ratio deviation of each fuel area corresponding to the temperature detecting point, the main premixed fuel amount arithmetic unit 1108 used to calculate the main premixed fuel amount according to the load signal from external, and a display 1109 used to display the combustion error judgment result, the air-fuel ratio of the fuel area corresponding to the temperature detecting point, and the average air-fuel ratio, etc. Those functions of the controller 100*a* are provided corresponding to each of the combustors except for the display unit 1109 and the main premixed fuel amount arithmetic unit.

This embodiment hardware configuration is the same as that of the fourth embodiment except that a premixed fuel adjusting valve 188 is provided for the premixing burner fuel pipe 187.

The operation of this embodiment will be explained below. When the signal from any of the multiple thermo couples 135 is entered to the controller 100*a*, the combustion error judging unit 1101 judges whether or not the fuel area corresponding to the temperature detecting point in the stabilizer 130 is normal. This judgment is done by checking whether or not the temperature of the stabilizer 130 exceeds the preset upper or lower limit value just like in the fourth embodiment. If any signal from the multiple thermoelectric couples 135 provided in a single combustor 110 indicates "out of the preset temperature range", an abnormal signal is outputted to the main premixed fuel amount arithmetic unit 1108 to close the main premixed fuel adjusting valve 182 fully and stop the fuel feeding to all the combustors 110.

If the combustion is normal, the air-fuel ratio arithmetic units 1103*a* calculate the air-fuel ratio of each combustion chamber of each fuel area corresponding to each temperature detecting point of the stabilizer 130 using the formula 1. The average air-fuel ratio arithmetic unit 1104*a* calculates the average value of the air-fuel ratio values of the areas corresponding to the temperature detecting points in the stabilizer 130. This average air-fuel ratio is output to each air-fuel ratio deviation arithmetic unit 1106*a* to calculate the deviation from the air-fuel ratio of each area corresponding to each temperature detecting point. This air-fuel ratio deviation is output to each premixing burner fuel amount arithmetic unit 1107*a* to calculate the premixed fuel amount for each premixing burner to eliminate this deviation. The premixed fuel amount of each premixing burner is output to the premixing burner fuel adjusting valve 188 to adjust the premixed fuel to flow into the premixing burner fuel pipe 187 to assume this fuel amount.

As mentioned above, the temperature of the stabilizer 130 is also used in this embodiment just like in the fourth embodiment to check the combustion conditions. Thus, the premixed combustion conditions can be known accurately. In addition, since the fuel amount can be controlled for each premixing burner, the combustion conditions, which is apt to be imbalanced, in each combustor 110 can be leveled.

Figure 17:
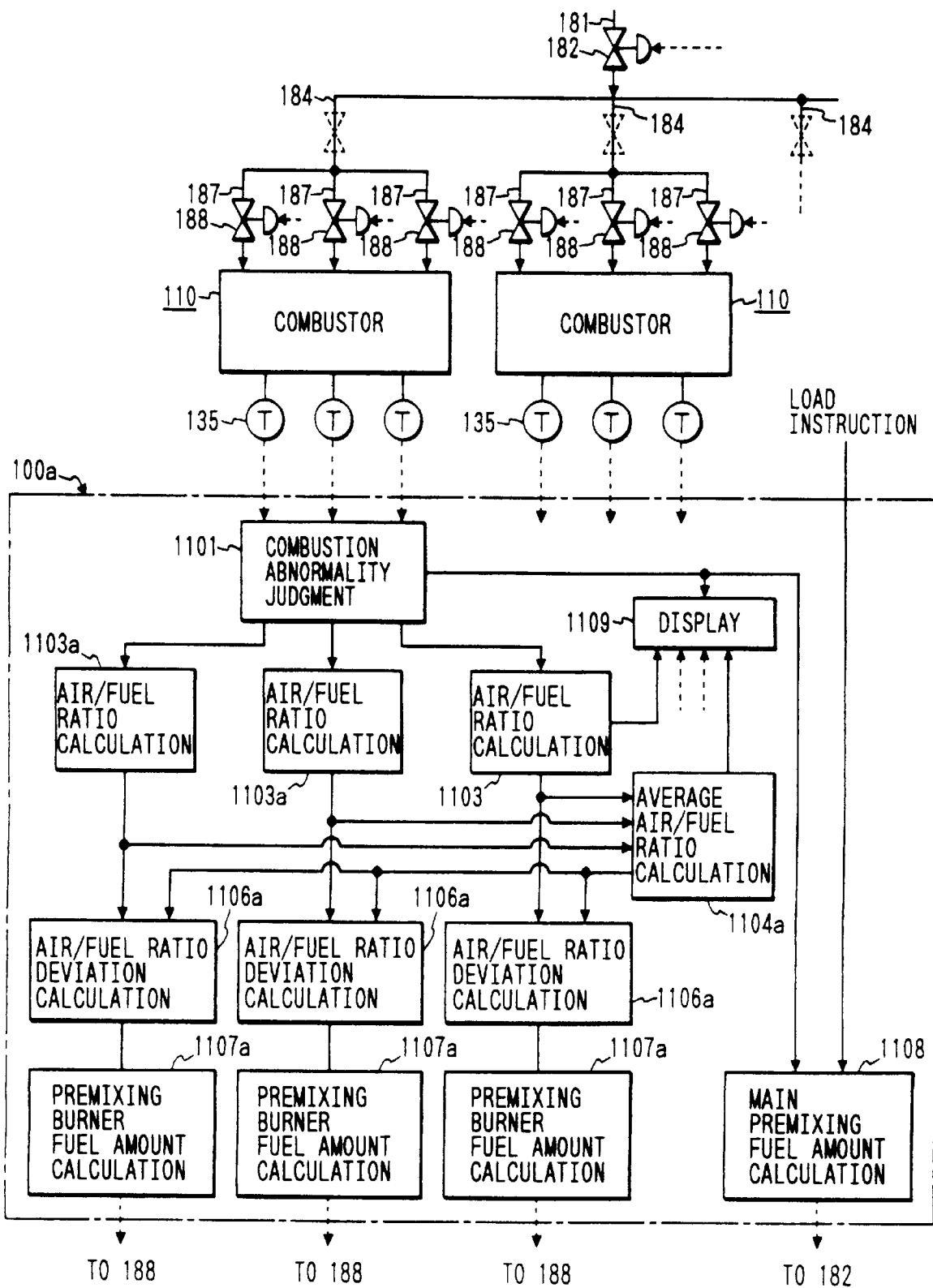
FIG. 17 is a functional block diagram of the controller in the fifth embodiment of this invention.

In FIG. 17, the number of premixed fuel adjusting valves 188 (=number of premixing burners 123) and the number of thermo couples 135 are the same. This is only for the reason of description. For example, only 4 thermo couples 135 may be used for 32 premixing burner fuel adjusting valves 188 in a combustor 110. In this case, 8 premixed fuel adjusting valves 188 (=32/4) are used to control premixed fuel according to the result of temperature measurement executed by one thermoelectric couple 135.

This embodiment is for controlling the fuel flow; to each premixing burner 123 in a combustor 110. In order to adjust the premixed fuel flow for each combustor 110, the controller 100*a* may also be provided with an individual combustor air-fuel ratio arithmetic unit 1103, all-combustor average air-fuel ratio arithmetic unit 1104 used to calculate the average air-fuel ratio of all the combustors 110, an air-fuel ratio deviation arithmetic unit 1106 used to calculate the average air-fuel ratio from the individual combustor air-fuel ratio and the average air-fuel ratio of all the combustors, and a sub premixed fuel amount arithmetic unit 1107 used to calculate the fuel flow to the sub premixed fuel pipe 184 from this air-fuel ratio deviation.

Embodiment 6

Next, a sixth embodiment of this invention will be explained using FIGS. 18 and 19. This embodiment is for controlling the air flow to each combustor 110*b* according to the temperature of the stabilizer 130.

Figure 18:
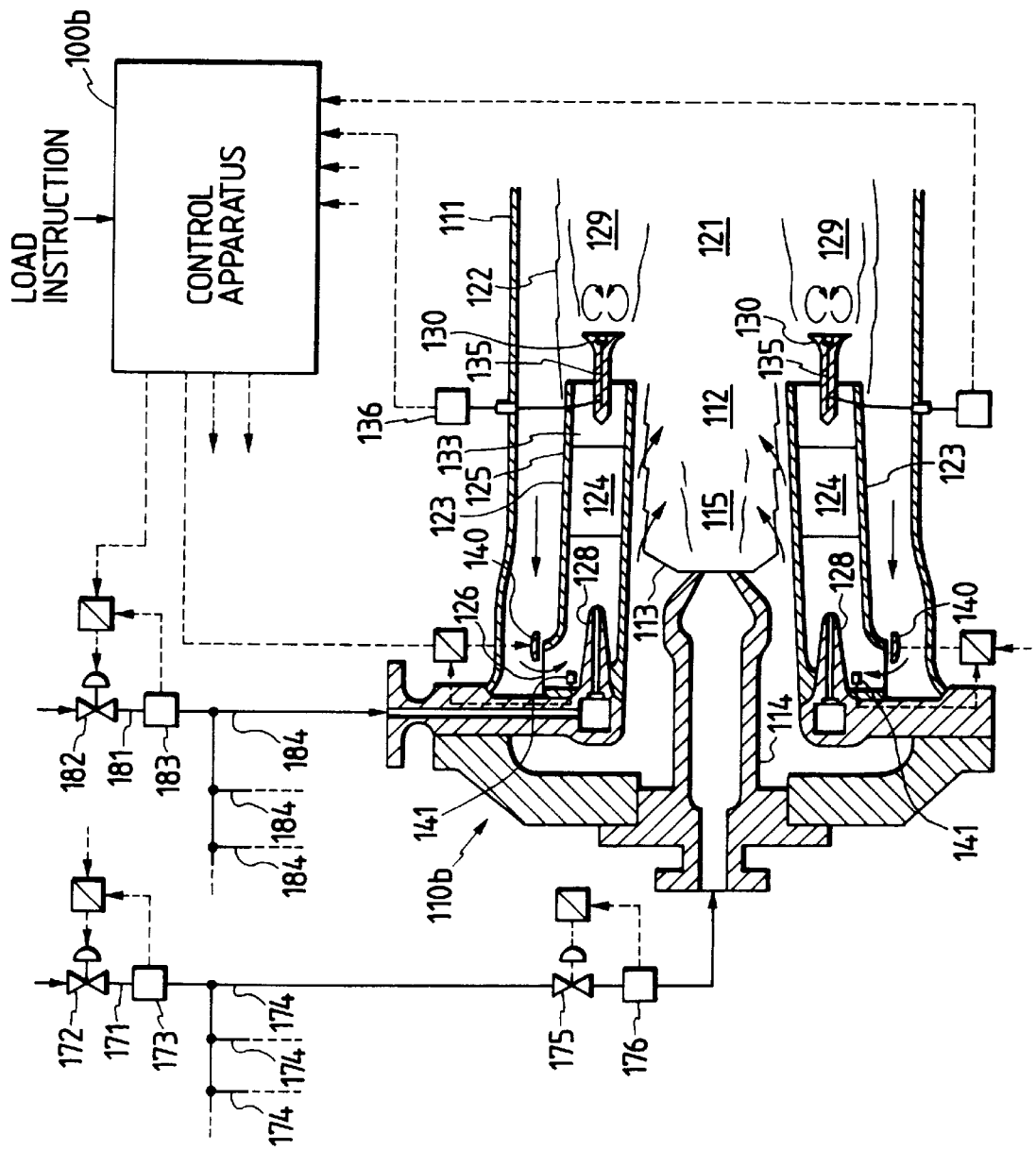
FIG. 18 is a sectional view of the combustor in the sixth embodiment of this invention and the combustor configuration.
Figure 19:
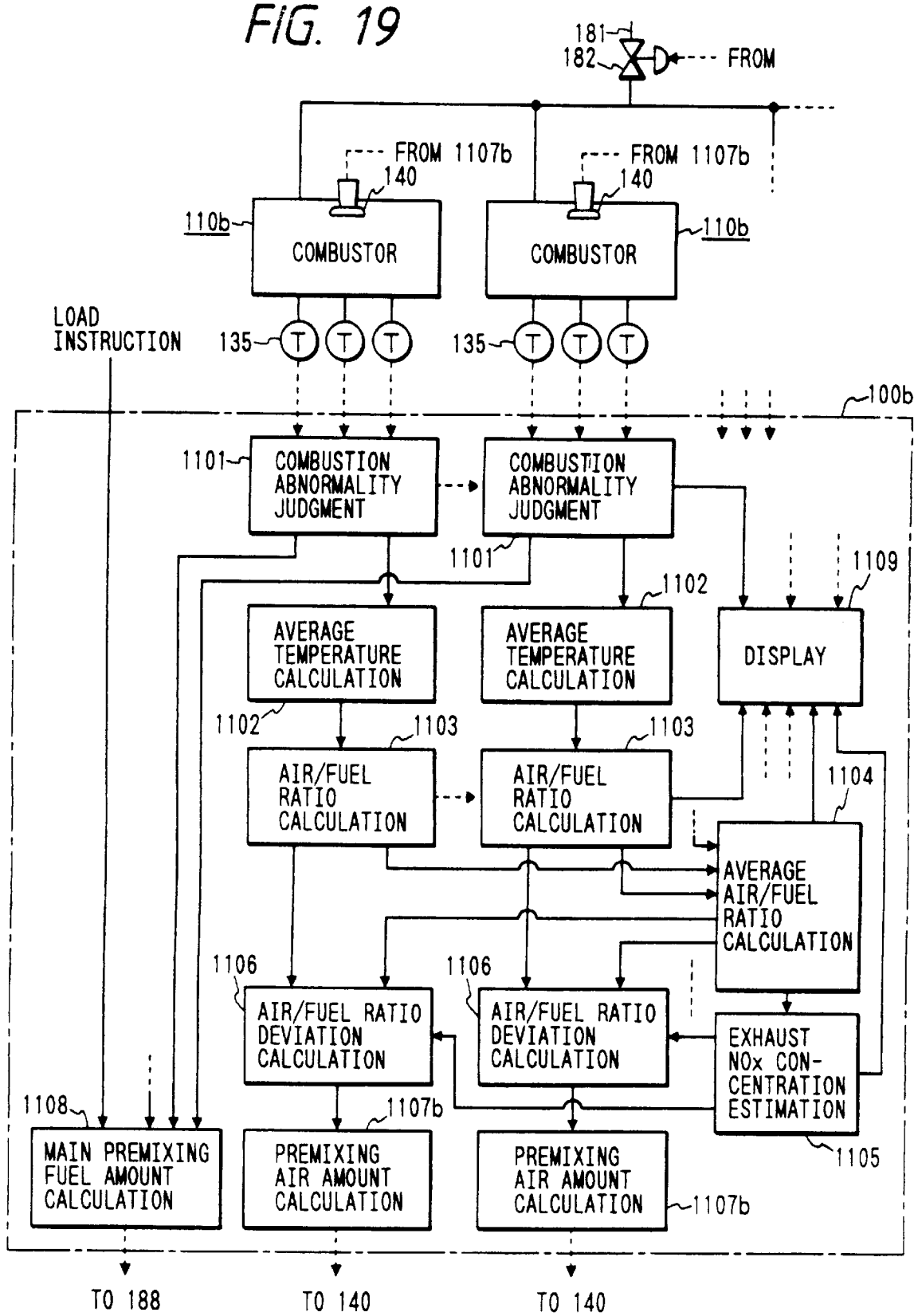
FIG. 19 is a functional block diagram of the controller in the sixth embodiment of this invention.

A combustor 110*b* in this embodiment, as shown in FIG. 18, is provided with an air flow meter 141 used to measure the air flow for premixed combustion to be fed into a premixing chamber 124 from an air intake 126 of each premixing burner 123, and a premixed air adjusting valve 140 used to adjust the said air flow. The air flow meter 141 and the premixed air adjusting valve 140 are provided at the air intake 126. The other combustion chamber configuration is the same as that of the fourth embodiment.

Since the controller 100*b* in this embodiment is used to control the air-fuel ratio for each combustor 110*b* according to the temperature of the stability 130, it is basically the same as that in the fourth embodiment. However, this embodiment is for controlling the air flow to each combustor 110*b* when controlling the air-fuel ratio for each combustor 110*b*, so the air flow into the premixing burner 123 is calculated in the premixed air amount arithmetic unit 1107*b* according to the air-fuel ratio calculated in the air-fuel ratio deviation arithmetic unit 1106 and this air amount is output to the premixed air adjusting valve 140.

In this embodiment, the air flow into each combustor 110 is controlled, but the air-fuel ratio in each combustor 110 can be almost fixed. Thus, this embodiment can obtain the same effect as in the first embodiment.

A premixed air adjusting valve 140 is also provided to each premixing burner 123 in this embodiment, so the air flow into each premixing burner 123 may be controlled just in the fifth embodiment.

Embodiment 7

Figure 20:
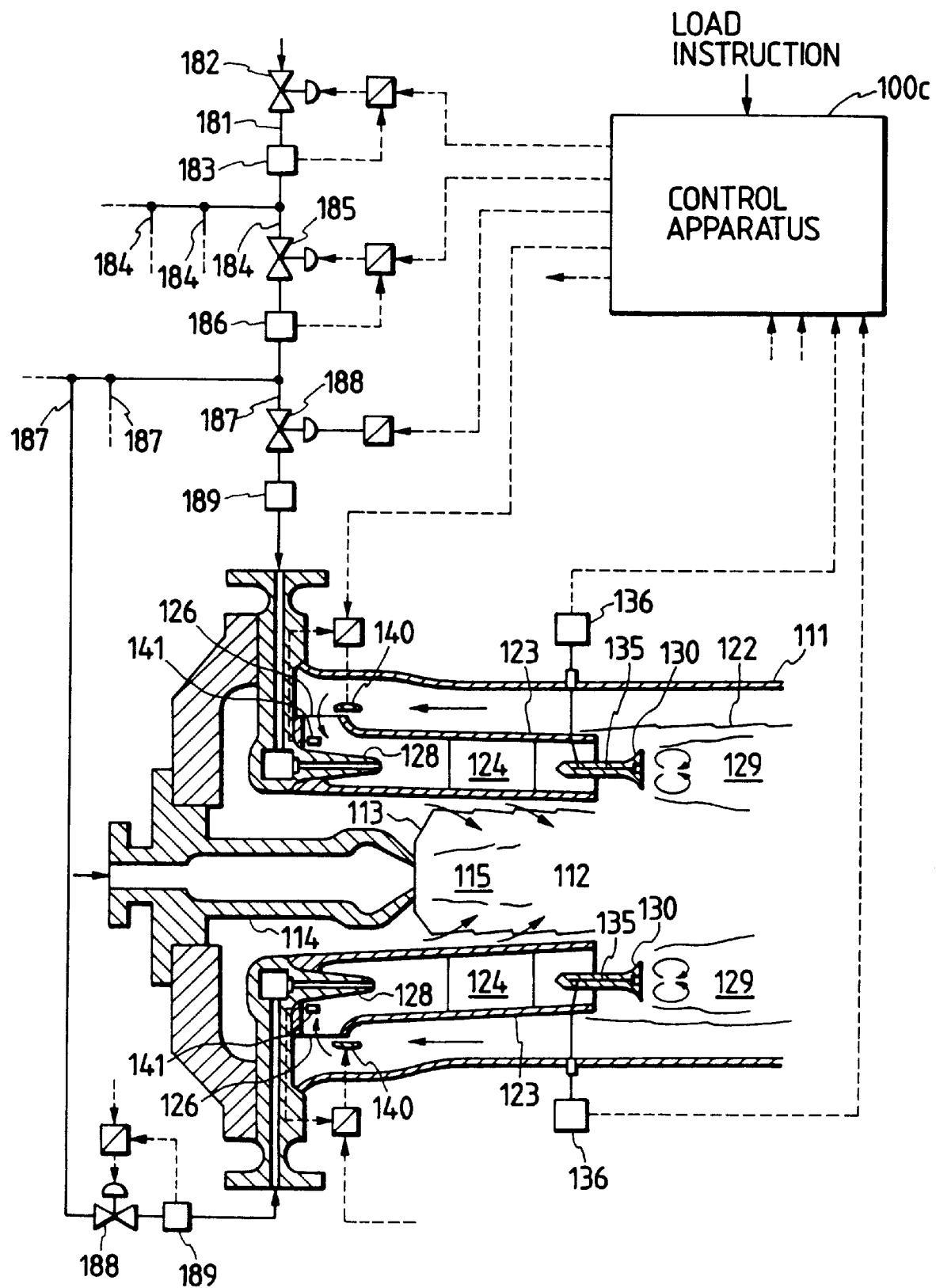
FIG. 20 is a sectional view of the combustor in the seventh embodiment of this invention and the combustor configuration.

Next, a seventh embodiment of this invention will be explained using FIG. 20.

This embodiment is a combination of the controls mentioned in the above-mentioned embodiments.

In other words, this embodiment is for adjusting the air-fuel ratio in each combustor and the air-fuel ratio for a single combustor by controlling the sub premixed fuel adjusting valve, the premixing burner fuel adjusting valve, and the premixed air adjusting valve according to the temperature of the stabilizer in each combustor. The controller combines the functions of the said embodiments for execution.

According to this embodiment, the air-fuel ratio of each combustor, as well as the air-fuel ratio for a single combustor can be prevented from imbalance. However, since so many adjusting valves of various types are used in this embodiment, this embodiment may become more unfavorable than the said embodiments in the aspect of the manufacturing cost and trouble occurrence frequency.

In the above-mentioned embodiments, thermo couples 135 are used to measure the temperature of the stabilizer 130, but other measuring devices, for example, temperature measuring resistors can be used instead if they can measure the temperature approximately to the allowable temperature of the stabilizer 130.

Figure 21:
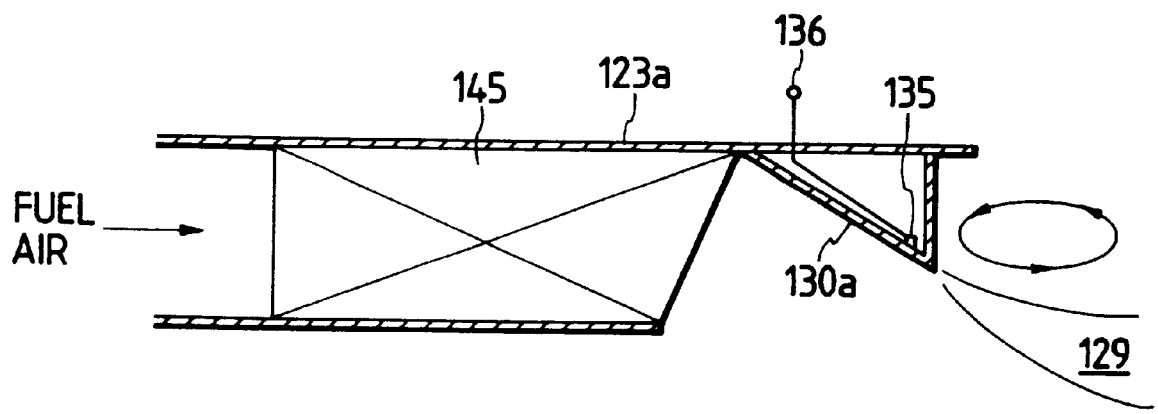
FIG. 21 is a cross-sectional view of the premixing burner and the stabilizer in another embodiment of this invention.
Figure 22:
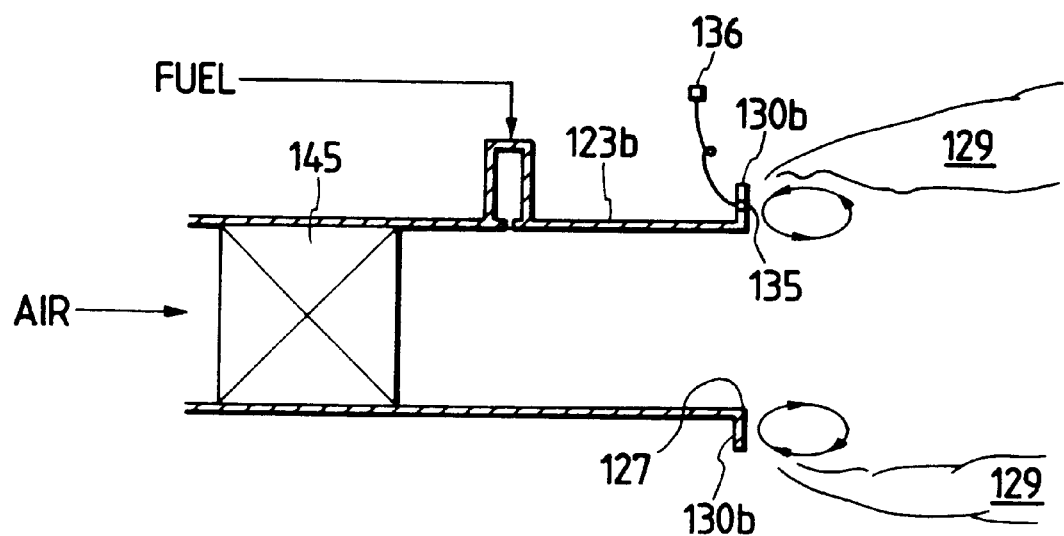
FIG. 22 is a cross-sectional view of the premixing burner and the stabilizer in one more different embodiment of this invention.

The stabilizer 130 in the above-mentioned embodiments is a so-called bluff body stabilizer that divides the premixed gas jet out from a premixing burner 123 into two parts. This invention may also allow another type stabilizer to be used. For example, a so-called recess type stabilizer 130a shown in FIG. 21 may be used. The recess type stabilizer forms a circulation of combustion gas at the downstream side of the stabilizer itself without dividing the premixed gas. The stabilizer may also be the one 130b shown in FIG. 22. It forms a circulation of combustion gas around the jet port 127b of a premixing burner 123b and in the downstream of the same nozzle. If any of the stabilizers 130a and 130b is to be adopted, preferably the temperature at the angle portion of the stabilizer 130a/130b that will become an ignition point of premixed combustion flame 129 should be measured. Reference number 145 in FIGS. 21 and 22 indicates swirling blades.

What is claimed is:

1. A gas turbine combuster comprising:
    a plurality of premixing burners, each for jetting out a premixed gas of fuel and air;
    a plurality of premixing fuel lines connected to said Plurality of premixing burners, respectively, each said premixing fuel line having a fuel flow adjusting device;
    a stabilizer for forming a circulation of combustion gas generated through combustion of said premixed gas, said stabilizer having an annular shape and a heating surface at a most downstream portion of said stabilizer, said stabilizer being disposed so that at a downstream side of said stabilizer the premixed gas jetted from each said premixing burner flows downstream of said stabilizer through inner and outer sides of said stabilizer;
    means for setting, before a practical operation of said combustor, a relationship between a temperature of said stabilizer and combustion conditions of a premixed gas;
    a plurality of thermometers arranged in said stabilizer close to said heating surface to be circumferentially distant from each other;
    means for adjusting a fuel flow rate to each said premixing burner according to said relationship and a detected temperature of said stabilizer at a position corresponding to each said premixing burner; and
    means for stopping fuel supply to all of said plurality of premixing burners when a temperature of said stabilizer detected by any one of said plurality of thermometers is a preset value or larger.

2. A gas turbine combustor comprising:
    a plurality of premixing burners, each for jetting out a premixed gas of fuel and air;
    a plurality of premixing fuel lines connected to said plurality of premixing burners, respectively;
    a stabilizer for forming a circulation of combustion gas generated through combustion of said premixed gas, said stabilizer having an annular shape and a heating surface at a most downstream portion of said stabilizer, said stabilizer being disposed so that at a downstream side of said stabilizer the premixed gas jetted from said plurality of premixing burners flows downstream of said stabilizer through inner and outer sides of said stabilizer;
    means provided close to said heating surface of said stabilizer for detecting a temperature of said stabilizer, said temperature detecting means including a plurality of thermometers arranged in said stabilizer to be circumferentially distant from each other; and
    a control system for controlling and adjusting a fuel quantity to each said premixing burner relative to the other burners through each said premixing fuel line on the basis of temperature of said stabilizer detected by each said thermometer at a position corresponding to each said burner, wherein said control system changes fuel quantities of said premixing fuel lines to a preset control value when any one of said stabilizer temperatures detected by said plurality of thermometers reaches a predetermined value or more.

3. The gas turbine combustor according to claim 2, wherein said control system has a relationship input therein of combustion conditions of said premixed gas to temperatures of said stabilizer, and said control system judges the combustion conditions according to the measured temperature of said stabilizer and said relationship.

4. The gas turbine combustor described in claim 3, wherein said relationship indicates whether the combustion condition is normal or abnormal according to whether or not the temperature of said stabilizer is within a preset temperature range.

5. The gas turbine combustor described in claim 3, wherein said relationship indicates the relationship between said stabilizer temperature and an air-fuel ratio of said premixed gas.

6. The gas turbine combustor described in claim 3, wherein said relationship indicates the relationship between said stabilizer temperature and a NOx concentration in said combustion gas.

7. The gas turbine combustor described in claim 2, wherein there is provided means for displaying said combustion conditions.

8. The gas turbine combustor according to claim 2, wherein said control system controls said combustor so that when the detected temperature is beyond the predetermined set value, fuel supply to all of said premixed burners is stopped, whereby preventing flash-back.

9. The gas turbine combustor according to claim 2, wherein said control system controls so as to close a main adjusting valve for adjusting a quantity of fuel for all of said premixed burners when the temperature detected by at least one of said thermometers is beyond the predetermined set value.

10. The gas turbine combustor according to claim 2, wherein each of said thermometers is embedded in said stabilizer.

* * * * *